US012236628B1

(12) United States Patent
Karuppusamy et al.

(10) Patent No.: US 12,236,628 B1
(45) Date of Patent: Feb. 25, 2025

(54) DETECTING AND CONFIRMING INTERACTIONS BY PROXIMITY AND VIDEO

(71) Applicant: Amazon Technologies, Inc., Seattle, WA (US)

(72) Inventors: Saranya Karuppusamy, Seattle, WA (US); Ao Yan, Seattle, WA (US); Liem Dinh, Seattle, WA (US); Peiran Zhou, Seattle, WA (US); Sabarishkumar Iyer, Seattle, WA (US); Waqas Ahmed, Clyde Hill, WA (US); Helene Causse, Seattle, WA (US); Danny Guan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 670 days.

(21) Appl. No.: 16/454,805

(22) Filed: Jun. 27, 2019

(51) Int. Cl.
G06T 7/292 (2017.01)
G06T 7/70 (2017.01)

(52) U.S. Cl.
CPC ............... G06T 7/70 (2017.01); G06T 7/292 (2017.01); G06T 2207/30196 (2013.01); G06T 2207/30232 (2013.01)

(58) Field of Classification Search
CPC . G06T 7/292; G06T 7/70; G06T 2207/30196; G06T 2207/30232; G09G 2354/00; G09G 5/003
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,449,343 B2 * | 9/2016 | Mayerle | G06Q 30/0268 |
| 9,473,747 B2 * | 10/2016 | Kobres | G06Q 30/00 |
| 10,055,853 B1 | 8/2018 | Fisher et al. | |
| 10,304,053 B1 * | 5/2019 | Templeton | G06Q 20/12 |
| 10,373,322 B1 * | 8/2019 | Buibas | G06T 7/246 |

(Continued)

OTHER PUBLICATIONS

Do, Chau, and Wolfram Burgard. "Accurate Pouring with an Autonomous Robot Using an RGB-D Camera." International Conference on Intelligent Autonomous Systems. Springer, Cham, 2018, 12 pages.

(Continued)

Primary Examiner — Shaghayegh Azima
(74) Attorney, Agent, or Firm — Athorus, PLLC

(57) ABSTRACT

Product spaces for containers of non-discretized items are defined by sets of points in three-dimensional space. When a customer breaches or contacts a product space established for a container of the non-discretized items, video feeds representing the product space are displayed to an associate in a web page or another user interface. By interacting with the user interface, the associate may view the video feeds and make a determination as to whether the customer received any of the non-discretized items from the container, and to confirm an identity of the customer accordingly.

22 Claims, 18 Drawing Sheets

(56) References Cited

U.S. PATENT DOCUMENTS

| | | | |
|---|---|---|---|
| 10,535,146 B1 | 1/2020 | Buibas et al. | |
| 10,891,470 B2* | 1/2021 | Yamashita | G06Q 10/087 |
| 10,956,726 B1* | 3/2021 | Quark | G06T 19/006 |
| 10,963,704 B2* | 3/2021 | Glaser | G06Q 20/202 |
| 10,974,953 B1* | 4/2021 | Towers | G06Q 20/102 |
| 11,087,271 B1* | 8/2021 | Guan | G06Q 10/087 |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0220124 A1* | 9/2009 | Siegel | G06T 7/292 |
| | | | 382/103 |
| 2009/0245573 A1 | 10/2009 | Saptharishi et al. | |
| 2011/0011936 A1 | 1/2011 | Morandi et al. | |
| 2011/0193939 A1* | 8/2011 | Vassigh | G06F 3/011 |
| | | | 348/169 |
| 2012/0284132 A1 | 11/2012 | Kim et al. | |
| 2013/0076898 A1 | 3/2013 | Philippe et al. | |
| 2013/0182114 A1* | 7/2013 | Zhang | H04N 7/181 |
| | | | 348/150 |
| 2013/0253700 A1* | 9/2013 | Carson | G16H 20/13 |
| | | | 700/236 |
| 2014/0279294 A1 | 9/2014 | Field-Darragh et al. | |
| 2014/0362223 A1* | 12/2014 | LaCroix | H04N 7/183 |
| | | | 348/150 |
| 2015/0019391 A1 | 1/2015 | Kumar et al. | |
| 2015/0073907 A1 | 3/2015 | Purves et al. | |
| 2018/0232796 A1* | 8/2018 | Glaser | G06Q 40/12 |
| 2018/0240180 A1* | 8/2018 | Glaser | G07G 1/0081 |
| 2019/0122424 A1* | 4/2019 | Moore | G06T 7/62 |
| 2019/0156086 A1 | 5/2019 | Plummer et al. | |
| 2020/0019921 A1 | 1/2020 | Buibas et al. | |
| 2020/0020112 A1* | 1/2020 | Buibas | G01G 19/4144 |
| 2020/0202177 A1* | 6/2020 | Buibas | G06V 10/764 |
| 2020/0279240 A1* | 9/2020 | Glaser | G06Q 20/20 |
| 2021/0067744 A1* | 3/2021 | Buibas | G06F 3/012 |
| 2021/0158051 A1 | 5/2021 | Dalal et al. | |
| 2021/0350545 A1* | 11/2021 | Fan | G10H 1/368 |

OTHER PUBLICATIONS

Do, Chau, Tobias Schubert, and Wolfram Burgard. "A Probabilistic Approach to Liquid Level Detection in Cups Using an RGB-D Camera." 2016 IEEE/RSJ International Conference on Intelligent Robots and Systems (IROS). IEEE, 2016, 6 pages.

Schenck, Connor, and Dieter Fox. "Visual Closed-Loop Control for Pouring Liquids." 2017 IEEE International Conference on Robotics and Automation (ICRA). IEEE, 2017, 8 pages.

Wilson, Justin, Auston Sterling, and Ming C. Lin. "Analyzing Liquid Pouring Sequences via Audio-Visual Neural Networks." IROS. 2019, 8 pages.

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

PRODUCT SPACE DEFINED FOR DISPENSING UNIT

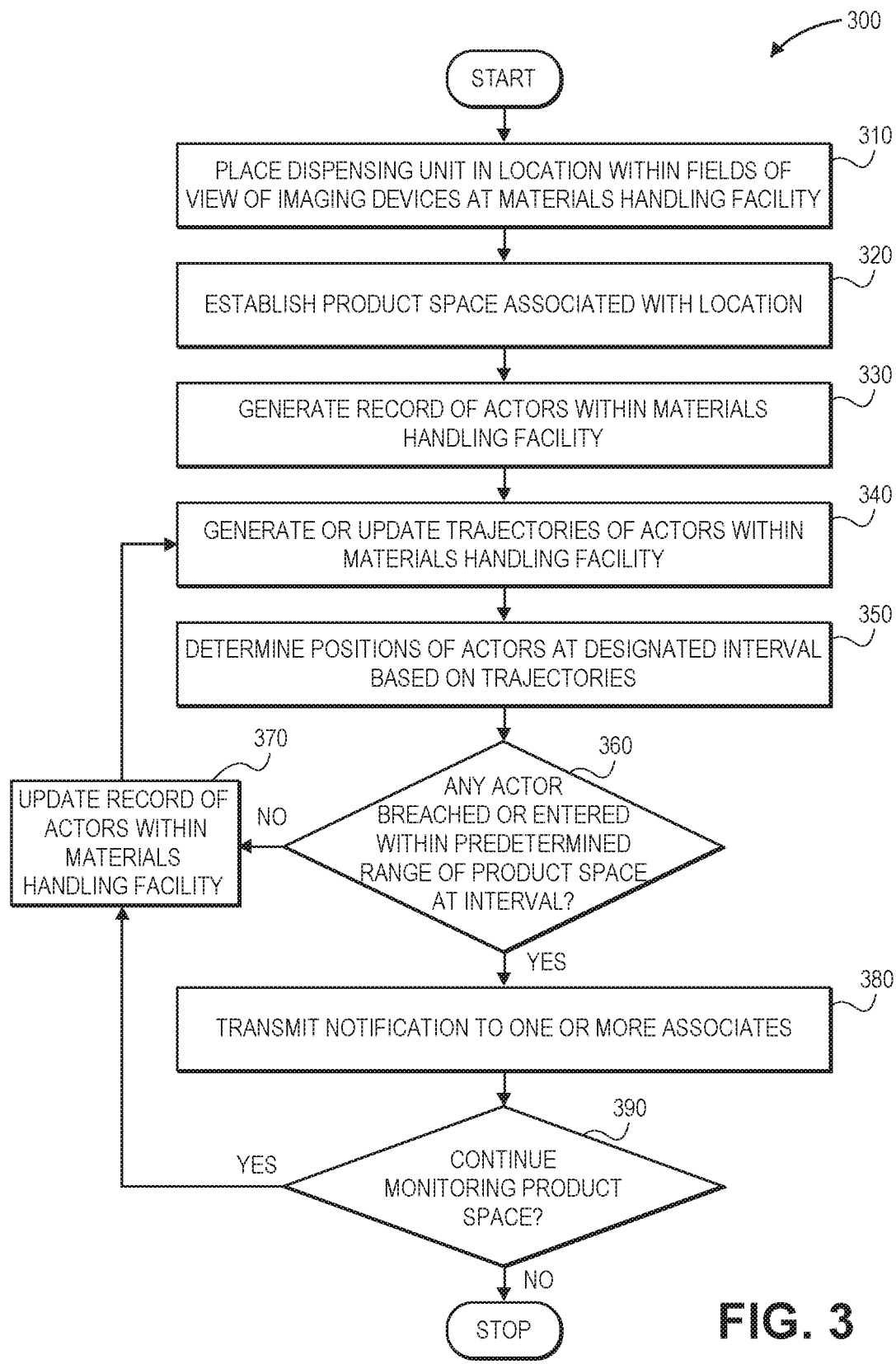

DETECTING AND CONFIRMING INTERACTIONS BY PROXIMITY AND VIDEO

BACKGROUND

Materials handling facilities such as traditional stores or retail establishments (or physical, walk-in or bricks-and-mortar stores or establishments) increasingly rely upon sensors to detect interactions with commercial goods by actors, or to associate such interactions with specific actors, such as when a customer removes an item from a shelf or other storage unit, or returns the item to the shelf or storage unit. For example, shelves or other storage units may be outfitted with one or more sensors such as imaging devices, load sensors (e.g., scales), radiofrequency identification (or "RFID") sensors, light detection and ranging (or "LIDAR") sensors, or other components for detecting interactions with one or more items by customers, associates or other personnel, or identifying the items or personnel involved in the interactions, e.g., by increasing or decreasing a level of inventory of the one or more items in a record, or by adding one or more items to or subtracting one or more items from a virtual "shopping cart" or other list of items to be purchased by a customer.

Sensors that are provided in association with one or more storage units are typically configured to detect interactions with discretized items, such as one or more discrete items in boxes, bags or other containers that are retrieved from a shelf, or placed onto a shelf. For example, digital cameras may capture imaging data which may be processed to determine when one or more hands of actors are empty or full, or to identify items that are disposed on a shelf or another storage unit, located within an actor's hand, or disposed in a bag, a basket or another carrying device associated with an actor. Load sensors may detect changes in mass or loading on a shelf, identify an item based on magnitudes of such changes, and determine that the item has been placed on the shelf or removed from the shelf based on whether the mass or loading has increased or decreased. Where items bear one or more RFID transmitters (or tags) associated therewith, the placement of an item on a shelf or storage unit, or the removal of the item from the shelf or storage unit, may be detected based on the presence or absence of an RFID signal at an RFID reader or receiver.

Such sensors are typically unable, however, to detect interactions with non-discretized items, or types of consumer goods that are distributed and sold in amounts that may be selected by customers, or in containers having a variety of sizes or shapes, or different external appearances (e.g., colors or textures). Some consumer goods that are sold in non-discretized quantities may include liquids (e.g., beverages such as coffees, fountain drinks or other dispensed beverages, or ice creams) or solids (e.g., dry stores such as flour, sugar, rice, beans or candy). Where non-discretized items are sold, sensors such as imaging devices are frequently unable or ill-suited to determine whether an event of interest with one or more of such items has occurred, or to calculate a mass, a volume or another measurable quantity associated with the event.

BRIEF DESCRIPTION OF THE DRAWINGS

FIGS. 1A through 1I are views of aspects of one system for detecting or confirming interactions in accordance with implementations of the present disclosure.

FIG. 3 is a flow chart of one process for detecting or confirming interactions in accordance with implementations of the present disclosure.

DETAILED DESCRIPTION

As is set forth in greater detail below, the present disclosure is directed to systems and methods for confirming interactions with items, such as discretized or non-discretized items, based on digital imagery captured from within a materials handling facility. More specifically, one or more implementations of the present disclosure are directed to placing systems or components for storing and dispensing items (e.g., dispensing units) from discrete inventory locations within a materials handling facility, and defining or establishing one or more product spaces, or regions defined by sets of pixels or points in space, that are associated with such locations. The product spaces may be defined or established with respect to inventory locations from which the dispensing units may be accessed, and may include systems or components for dispensing any type or form of items, including but not limited to discretized or non-discretized items.

Customers arriving at the materials handling facility may be identified in any manner, and their locations within the materials handling facility may be tracked using data captured by one or more sensors as video imagery is captured by one or more cameras mounted within the materials handling facility. At designated or predetermined intervals, e.g., ten seconds, locations of customers with respect to product spaces defined for one or more of the dispensing units are determined. Where a customer is determined to have contacted or breached a product space for a dispensing unit at a given time, or to otherwise be within a predetermined range of the product space at the given time, in accordance with a designated or predetermined interval, one or more feeds of video captured from within the materials handling facility prior to, at or following the given time are transmitted to a user interface and presented on a computer display. An associate or another human worker then evaluates the video files on the computer display and determines whether or which customer executed an interaction with one or more of the non-discretized items via the user interface.

Figure 1A:
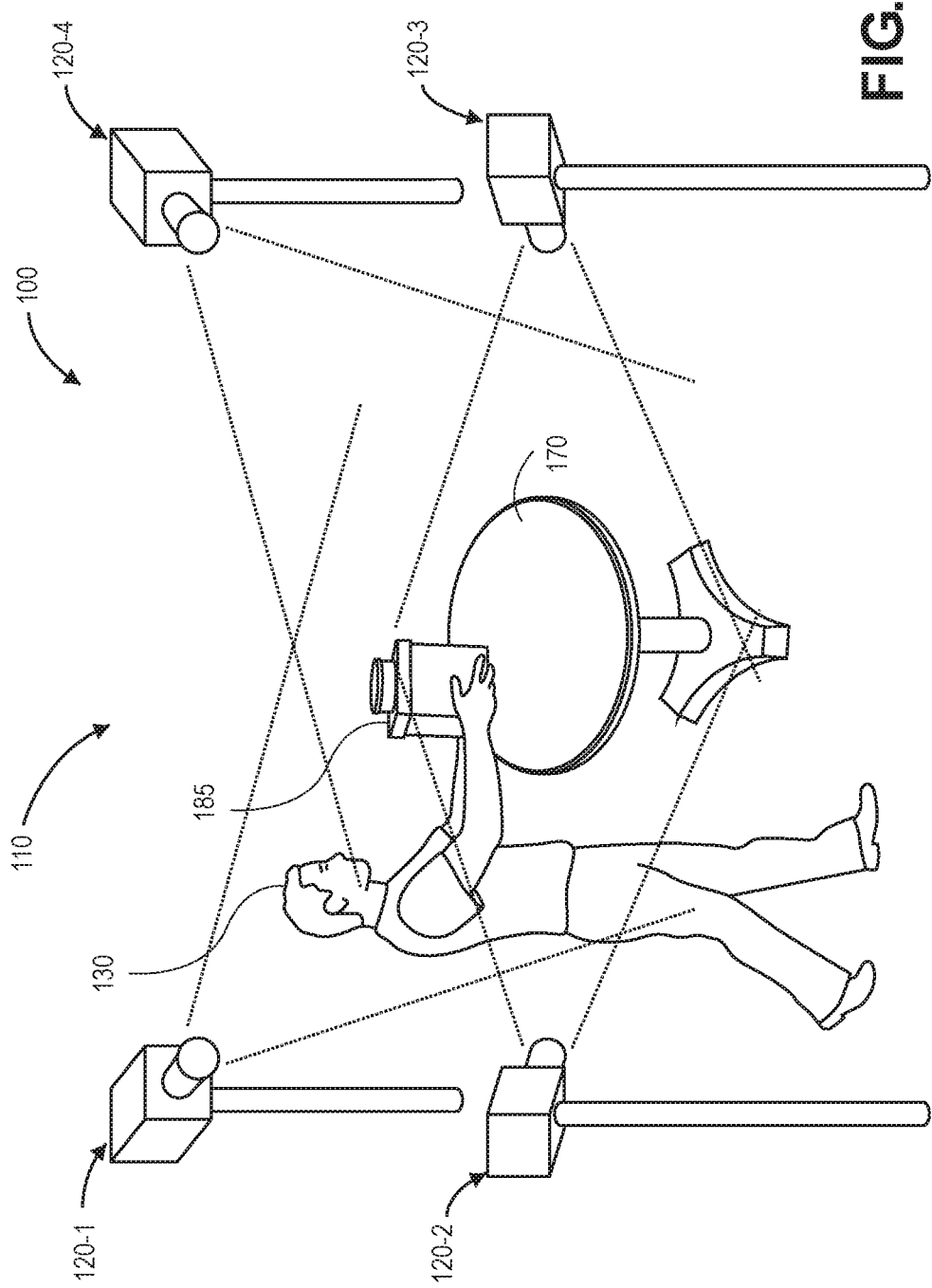

Referring to FIGS. 1A through 1I, views of aspects of one system 100 for detecting or confirming interactions in accordance with implementations of the present disclosure are shown. As is shown in FIGS. 1A and 1*i*, the system 100 includes a scene 110 such as a materials handling facility, a fulfillment center, a warehouse, or any other like facility. The scene 110 includes a plurality of imaging devices 120-1, 120-2, 120-3, 120-4 (e.g., digital cameras configured to capture visual images and/or depth images), and a storage unit 170 (e.g., a table, a shelf or another system having one or more inventory locations for storing items thereon or dispensing items therefrom). As is also shown in FIG. 1A, an associate (or a worker, or a vendor, or another actor) 130 deposits, installs or otherwise places a kettle (or another dispensing unit) 185 for maintaining non-discretized items such as soups, beverages or other liquids in a desired condition or state (e.g., at a desired temperature or pressure) on the storage unit 170, and for dispensing the non-discretized items by or to one or more customers, along with a plurality of bowls into which at least some of the non-discretized items may be dispensed from the kettle 185. In some implementations, the kettle 185 may be a system, or a component part of a system, for storing other non-discretized liquids such as beverages (e.g., coffee), toppings, sauces, dressings, or the like. For example, the kettle 185 may be configured to supply heat to such liquids, or to maintain such liquids at one or more selected temperature levels. Alternatively, in some other implementations, the kettle 185 may be a system or component part of a system for accommodating non-discretized solids (e.g., powders such as cocoa or flour, grains, beans, candy or the like) in a similar manner.

The imaging devices 120-1, 120-2, 120-3, 120-4 are aligned to include the storage unit 170 and the kettle 185 within their respective fields of view, which overlap at least in part over a portion of the scene 110. The imaging devices 120-1, 120-2, 120-3, 120-4 are configured to capture imaging data, such as still or moving images, from the scene 110. The imaging devices 120-1, 120-2, 120-3, 120-4 may be installed or otherwise operated independently or as components of an imaging device network (or camera network), and may be in communication with one or more computer devices or systems (not shown), e.g., over one or more computer networks. Additionally, the imaging devices 120-1, 120-2, 120-3, 120-4 may be calibrated, such that mappings between coordinates of imaging data captured by the imaging devices 120-1, 120-2, 120-3, 120-4 and directions relative to their respective image sensors are known.

The scene 110 may be any open or enclosed environment or space in which any number of actors (e.g., humans, other animals or machines) including but not limited to the associate 130 may execute one or more poses, gestures or other actions within the fields of view of the imaging devices 120-1, 120-2, 120-3, 120-4. For example, as is shown in FIGS. 1A and 1i, the associate 130 is in motion within a vicinity of the storage unit 170, and is partially or entirely within the fields of view of the imaging devices 120-1, 120-2.

Figure 1B:
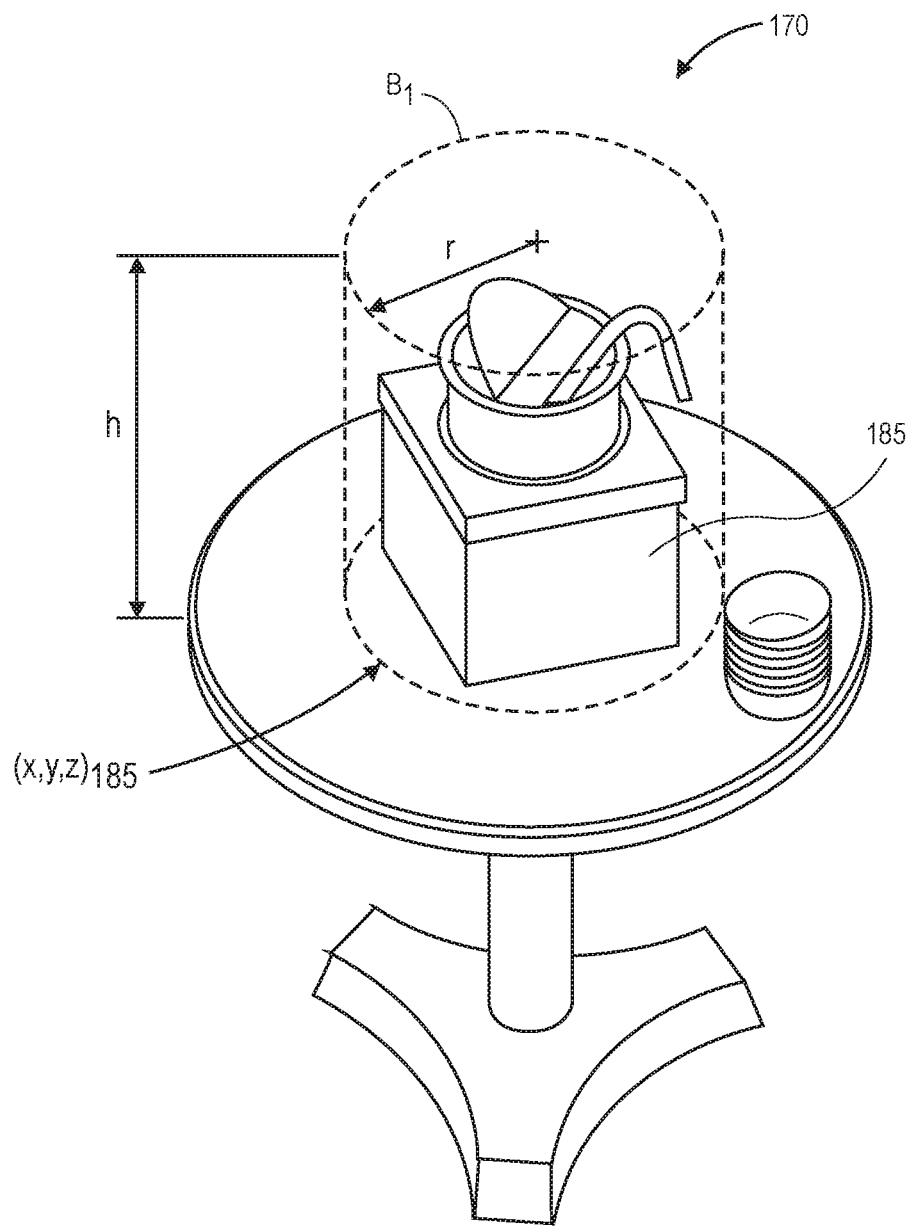

As is shown in FIG. 1B, after the kettle 185 has been deposited, installed or otherwise placed on the storage unit 170, a product space (or bounding box) $B_1$ including one or more interaction points may be defined or established with respect to an inventory location $(x, y, z)_{185}$ of the kettle 185. The product space $B_1$ may include any number of points in three-dimensional space, e.g., referenced by sets of Cartesian coordinates, or coordinates according to any other system, that define a location where an interaction by an actor (e.g., a customer) may result in an interaction with the kettle 185. Alternatively, the product space $B_1$ may include a plurality of pixels or positions of such pixels in three-dimensional space that surround, include or are otherwise associated with the kettle 185. The product space $B_1$ may be defined or established with any size or in any shape with respect to the inventory location of the kettle 185 on the storage unit 170. As is shown in FIG. 1B, the product space $B_1$ has a plurality of points defining a shape of a cylinder having a height h and a radius r and including the inventory location $(x, y, z)_{185}$ of the kettle 185 on the storage unit 170. Alternatively, or additionally, another product space (or bounding box) may be defined or established with respect to the bowls on the storage unit 170, of any size or shape, in the same manner as the bounding box $B_1$ described above.

Figure 1C:
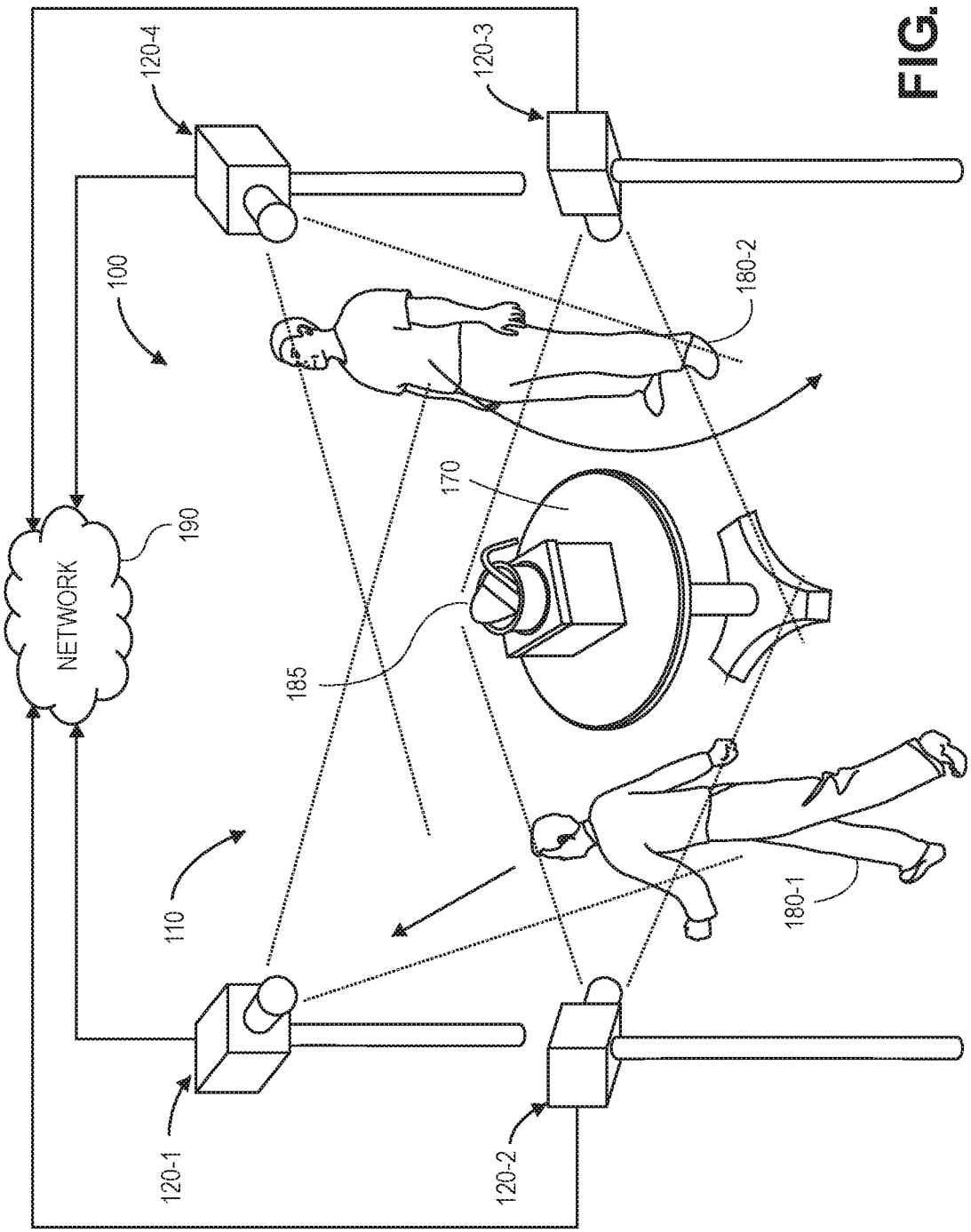

As is shown in FIG. 1C, each of the imaging devices 120-1, 120-2, 120-3, 120-4 is in communication with a network 190, e.g., by wired or wireless connections. As is shown in FIG. 1C, the imaging devices 120-1, 120-2, 120-3, 120-4 are aligned to capture images depicting the storage unit 170 and/or the kettle 185, or any activity occurring within a vicinity of the storage unit 170 or the kettle 185. For example, as is shown in FIG. 1C, a plurality of customers 180-1, 180-2 (or other actors) pass by or near the storage unit 170 and the kettle 185, and within the fields of view of one or more of the imaging devices 120-1, 120-2, 120-3, 120-4.

Figure 1D:
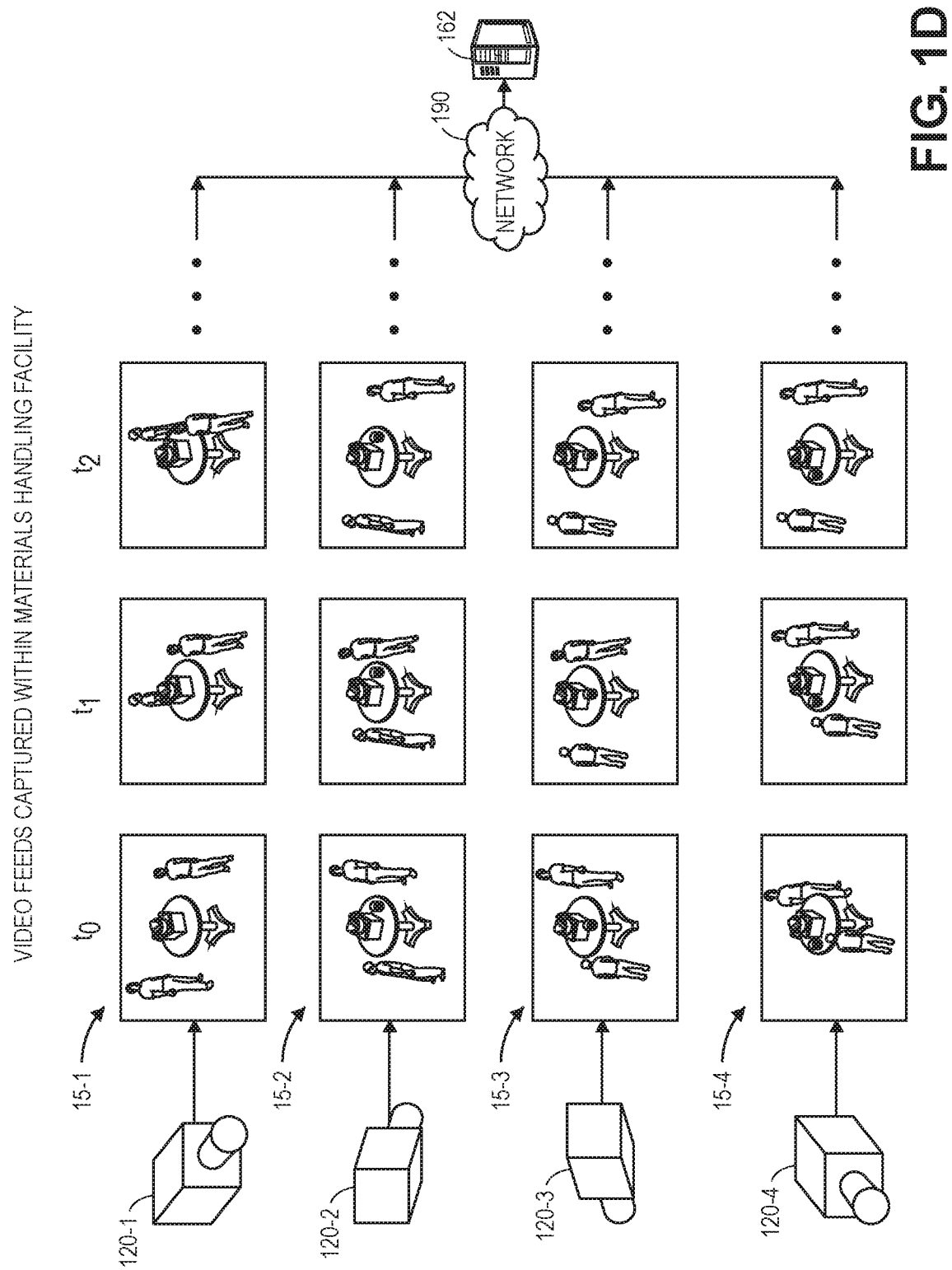

As is shown in FIG. 1D, video feeds 15-1, 15-2, 15-3, 15-4 of images captured using the imaging devices 120-1, 120-2, 120-3, 120-4 are transmitted to a server 162 or another computer device or system over a network 190, where the images of the video feeds 15-1, 15-2, 15-3, 15-4 may be stored in one or more files or records and used for any purpose. The server 162 may be located in one or more physical, alternate or virtual locations, e.g., in a "cloud"-based environment.

In some implementations, the server 162 or another computer device or system may process the images of the video feeds 15-1, 15-2, 15-3, 15-4, along with information or data regarding the positions and/or orientations of the cameras, to generate trajectories $M_1(t)$, $M_2(t)$ (or tracklets) representing locations, movements or orientations of personnel on the scene 110, including but not limited to the associate 130 and/or the customers 180-1, 180-2. Alternatively, or additionally, the scene 110 may include one or more other sensors (not shown) for determining the locations, the movements or the orientations of the personnel on the scene 110, such as the associate 130 or the customers 180-1, 180-2. Such sensors may include, but are not limited to, LIDAR sensors, RFID sensors, load sensors, or any other type or form of sensors, which may capture information or data and also provide the information or data to the server 162 over the network 190.

Figure 1E:
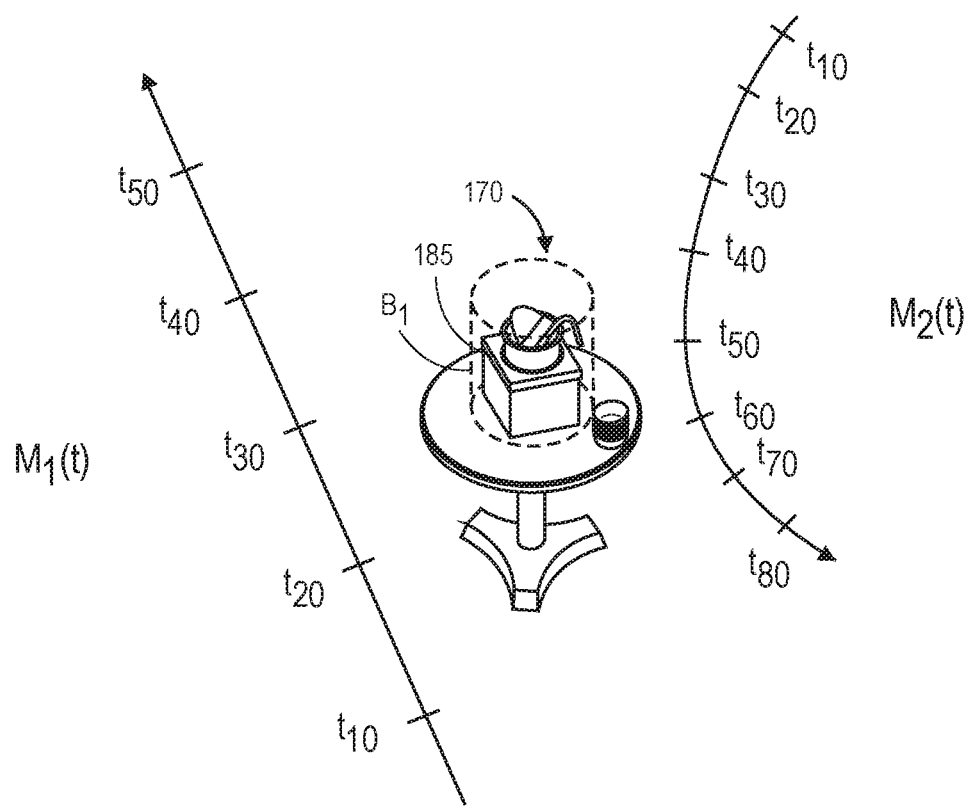

As is discussed above, at designated or predetermined intervals, locations of customers with respect to product spaces defined for dispensing units, such as the product space $B_1$ defined for the kettle 185 can be determined. For example, as is shown in FIG. 1E, positions of the customers 180-1, 180-2 with respect to the product space $B_1$ are determined from the trajectories $M_1(t)$, $M_2(t)$, at ten second intervals $t_{10}, t_{20}, t_{30}, t_{40}, t_{50}, t_{60}, t_{70}, t_{80}$. The customer 180-1 passes in a substantially straight path along one side of the storage unit 170 from time $t_{10}$ to time $t_{50}$, and, according to the trajectory $M_1(t)$, is nearest the storage unit 170 at time $t_{20}$. The customer 180-2 passes in an arcuate path along an opposite side of the storage unit 170 from time $t_{10}$ to time $t_{80}$, and, according to the trajectory $M_2(t)$, is nearest the storage unit from times $t_{50}$ through $t_{80}$.

Figure 1F:
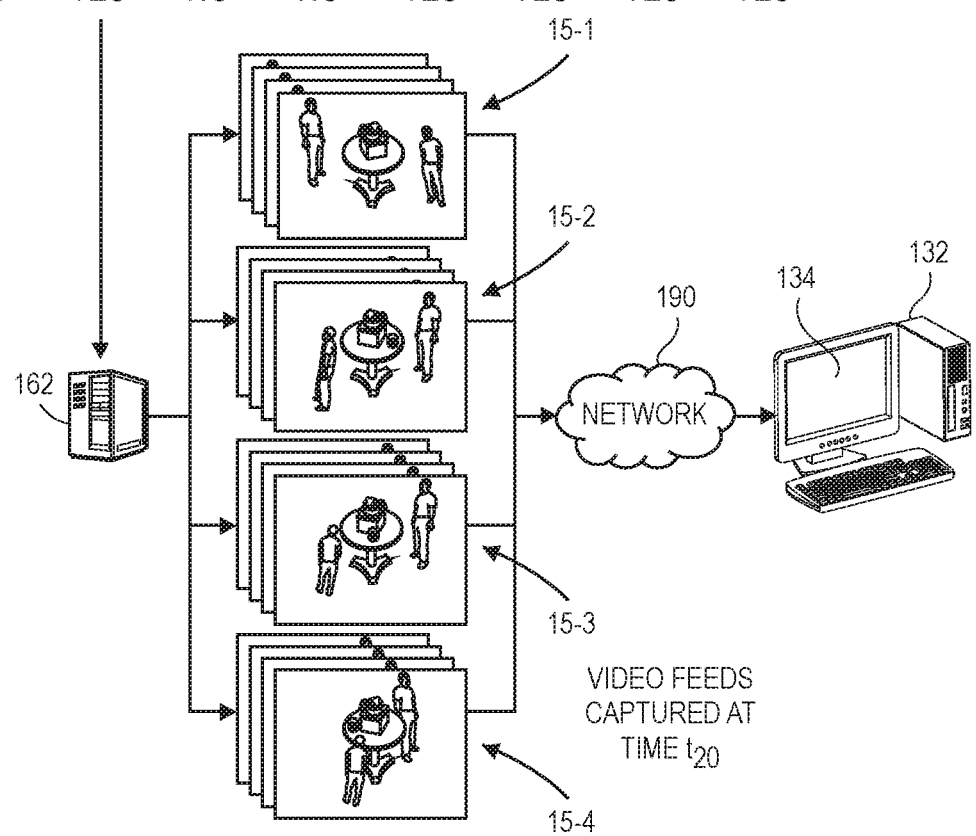

In accordance with implementations of the present disclosure, upon determining that a customer is within a predefined range of a product space associated with one or more items that is located within fields of view of one or more imaging devices, a notification including embedded video feeds or links to such video feeds may be provided to an associate, who may then determine whether a transaction occurred at such times, or to identify the customer that was involved with the transaction. As is shown in FIG. 1F, upon determining that a customer was within a predetermined range of the product space $B_1$ at time $t_{20}$, the server 162 retrieves the portions of the video feeds 15-1, 15-2, 15-3,

15-4 that were captured by the imaging devices 120-1, 120-2, 120-3, 120-4 over an interval or period of time including the time $t_{20}$, e.g., prior to the time $t_{20}$, at the time $t_{20}$ and after the time $t_{20}$. The customer may have been determined to have breached or entered within the predetermined range of the product space where one or more body parts of the actor is determined to be at or within one or more of the points in three-dimensional space from which the product space $B_1$ was formed, or within the predetermined range of any of such points. The server 162 then transmits the portions of the video feeds 15-1, 15-2, 15-3, 15-4 to a computer device 132 accessible to one or more associates, which may but need not include the associate 130.

Figure 1G:
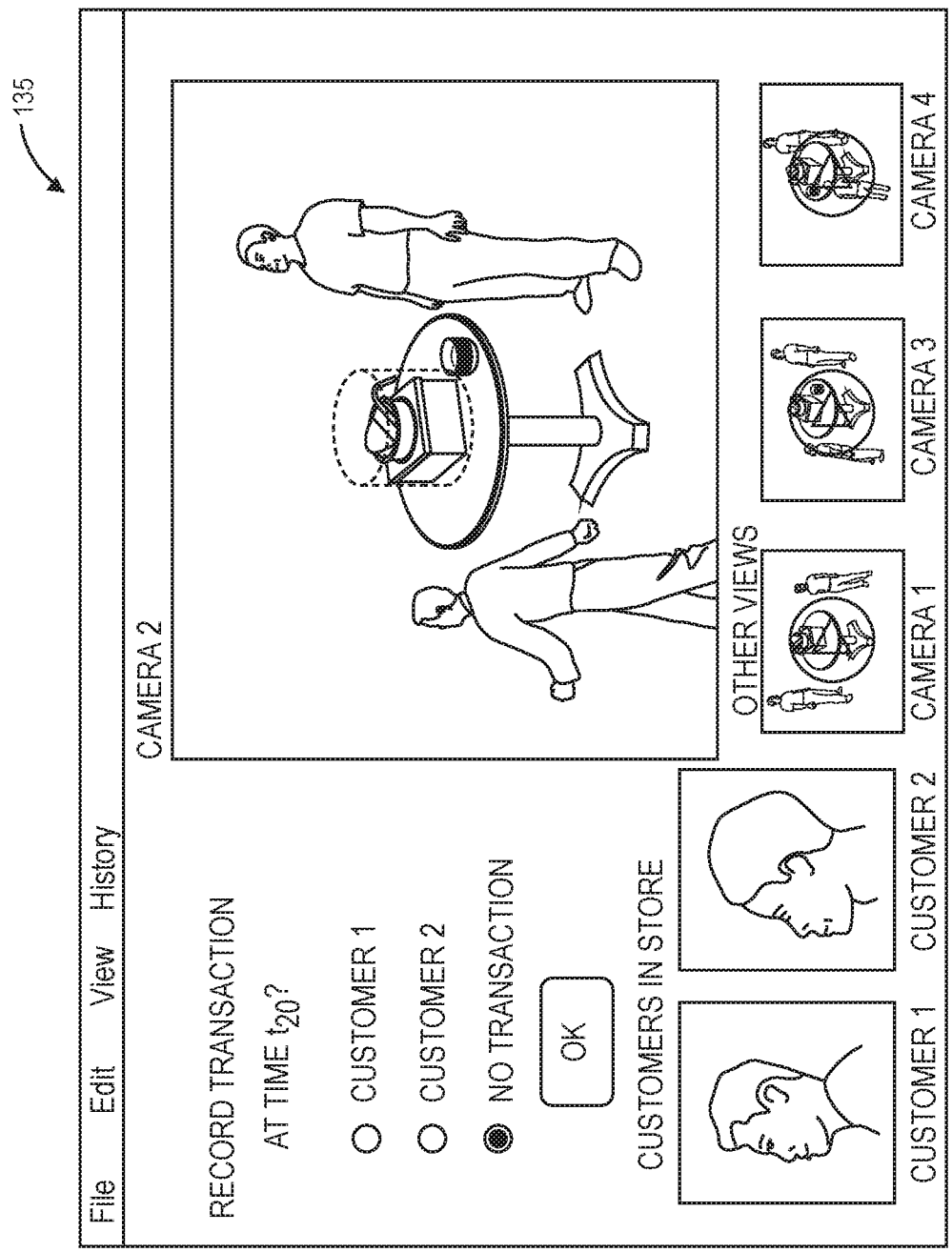

As is shown in FIG. 1G, a user interface 135 is displayed on a display of the computer device 132. The user interface 135 includes a video section in which portions of a video feed, viz., the video feed 15-1, captured at or around the time $t_{20}$ using one of the imaging devices 120-1, 120-2, 120-3, 120-4 may be displayed. The user interface 135 also includes an other views section beneath the video section, in which links to video feeds captured using other imaging devices are located. Additionally, the user interface 135 includes a customer identifier section in which names, images or other information regarding the customer 180-1, 180-2 are shown, as well as a transaction recordation section where the associate, upon viewing one or more of the video feeds, may make one or more interactions with the user interface 135 to indicate whether a transaction involving the non-discretized items in the kettle 185 occurred during at or around the time $t_{20}$, and, if a transaction did occur, which of the customers 180-1, 180-2 is responsible for the transaction.

Thus, as is also shown in FIG. 1G, upon viewing one or more of the video feeds via the user interface 135, an associate may indicate that a transaction did not occur at the time $t_{20}$ via the transaction recordation section.

Figure 1H:
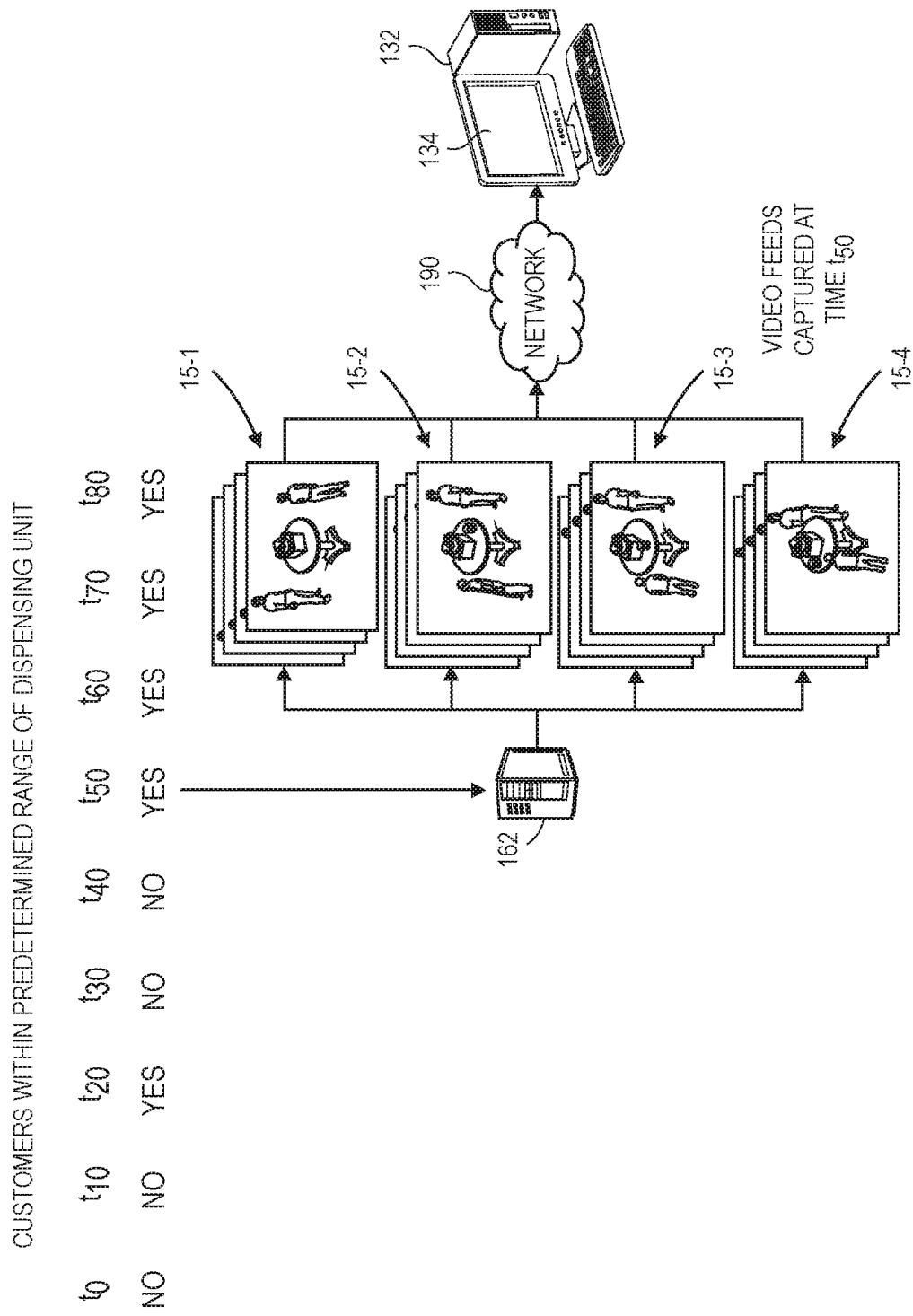
Figure 11:
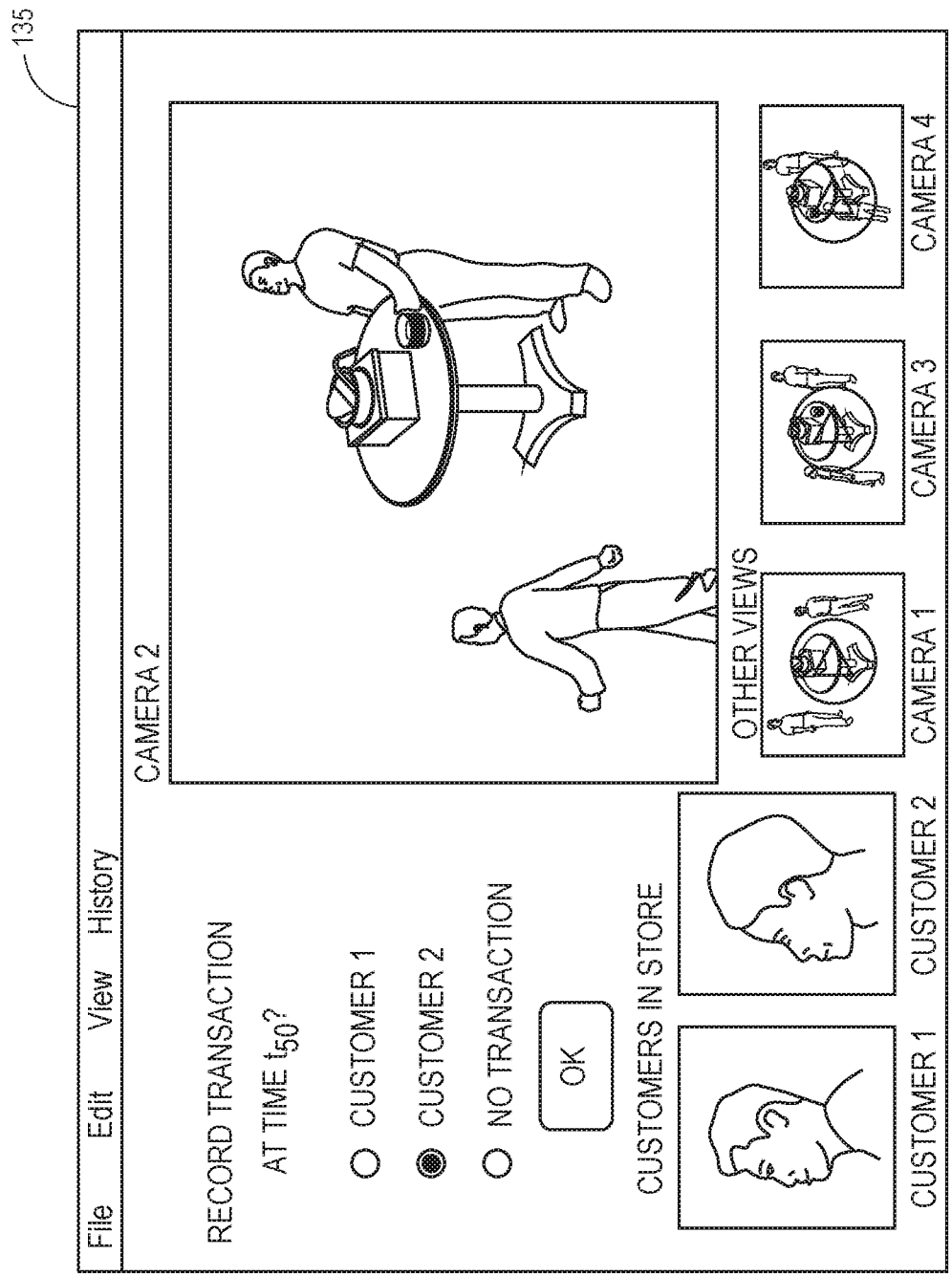

Similarly, as is shown in FIG. 1H, upon determining that a customer was within a predetermined range of the product space $B_1$ at the time $t_{50}$, portions of the video feeds 15-1, 15-2, 15-3, 15-4 captured by the imaging devices 120-1, 120-2, 120-3, 120-4 over an interval or period of time including the time $t_{50}$, e.g., prior to the time $t_{50}$, at the time $t_{50}$ and after the time $t_{50}$ are retrieved from the server 162 and transmitted to the computer device 132. As is shown in FIG. 1I, the video section of the user interface 135 includes a video feed captured at or around the time $t_{50}$ using one of the imaging devices 120-1, 120-2, 120-3, 120-4 may be displayed, and the other views section includes links to video feeds captured using other imaging devices.

Likewise, as is also shown in FIG. 1I, upon viewing one or more of the video feeds via the user interface 135, the associate may indicate that the customer 180-2 executed a transaction involving one or more of the non-discretized items in the kettle 185 at the time $t_{50}$ via the transaction recordation section.

Accordingly, the systems and methods of the present disclosure are directed to establishing product spaces or bounding boxes associated with systems or components for dispensing items (e.g., non-discretized items) at materials handling facilities, and capturing imaging data using one or more digital cameras or other imaging devices that include the product spaces (or bounding boxes) within their respective fields of view. Positions of customers within the materials handling facility are tracked and compared to inventory locations of the product spaces at regular intervals of time, such as every ten seconds. At designated or predetermined intervals, of approximately ten seconds or otherwise, whether a customer has breached or contacted a product space, or is within a predetermined range of the product space is determined. Upon determining that one or more customers has contacted or breached a product space at a given time, or is within a predetermined range of the product space at a given time, video feeds captured by the imaging devices prior to, at or after the given time are obtained and presented to a human associate, e.g., on one or more user interfaces. The human associate may then confirm whether a transaction involving one or more of the items within the product space has occurred, and identify a customer associated with the interaction, or indicate that a transaction did not occur, via the user interface.

Whether a customer has breached or contacted a product space or bounding area on a scene, or is within a predetermined range of the product space or bounding area, may be determined based on a variety of information or data obtained from the scene, including but not limited to imaging data captured using one or more imaging devices. For example, imaging data may be processed to detect one or more body parts such as arms or portions thereof (e.g., hands, wrists, forearms, elbows, upper arms or shoulders), to generate regression vectors, association scores or other pairs of pixels associating portions of the imaging data with specific actors on the scene, and to calculate probabilities that a given portion of a scene depicted in the imaging data is in a given state within a finite period of time. Positions of the one or more body parts of customers on a scene may be determined at a designated interval of time and compared to positions of surfaces or other features of one or more product spaces or bounding boxes at the scene. For example, when an inventory area is established and includes a plurality of inventory shelves or other storage units, pixels corresponding to regions associated with interaction points (e.g., product spaces or bounding boxes) for such inventory shelves or storage units (e.g., "touchpoints") may be identified within image planes of an imaging device as corresponding to portions of such image planes where an event is likely to occur. Information or data regarding body parts of customers that are present on the scene, e.g., trajectories (or tracklets) representing locations, movements or orientations of actors on the scene, and positions and orientations of imaging devices, are used to determine when one or more of the customers has breached or contacted, or is within a predetermined range of, one or more of such interaction points.

In some implementations, a scene that includes one or more storage units or other systems for accommodating items (e.g., non-discretized items) may be a facility such as a materials handling facility, a fulfillment center, a warehouse, or any other facility (e.g., indoor or outdoor). The scene may include any number of sensors, including but not limited to imaging devices (e.g., digital cameras), RFID sensors, LIDAR sensors, or any other type or form of sensors for determining that an actor (e.g., a customer or an associate) is present on a scene, or for determining positions of the actor on the scene.

In some implementations of the present disclosure, imaging data captured using one or more imaging devices (e.g., digital cameras) may be provided as inputs to one or more machine learning tools, systems or techniques that are trained to detect one or more body parts of actors depicted within imaging data, or to identify, for one or more pixels of such images, one or more body parts of an actor depicted therein that would be most likely associated with an interaction that might occur at one or more of such pixels. The machine learning tools, systems or techniques may be any type or form of tools, systems or techniques that are trained to detect one or more body parts of actors within images, and to associate pixels of such images that depict or represent such body parts or actors with pixels corresponding to locations or interactions occurring within such images. In some implementations, a processor or processor unit provided on an imaging device, a server or another computer device or machine may be programmed to execute a fully convolutional network (e.g., a residual network, such as a deep residual learning network) on inputs including images captured thereby. Alternatively, the processor or processor unit may be programmed to operate any other type or form of tool, system or technique, e.g., a sequential model, such as a Markov model, a linear dynamical system, or the like.

The systems and methods of the present disclosure may be configured to determine any type or form of interaction or event associated with any number of items has occurred based on imaging data, as well as planogram data (e.g., locations of items of interest, or interaction points or product spaces associated with such locations), trajectories or other information regarding positions or motion of actors on a scene, and positions and orientations of imaging devices from which the imaging data was captured. In some implementations, events of interest may involve any type of container or vessel of non-discretized items, including not only cups but also bowls, plates or dishes of any size or shape (e.g., round, square, triangular, or any other shape).

Furthermore, in some implementations, the non-discretized items may include any type or form of liquids such as beverages (e.g., coffee, milk, water, juice, soda or other fountain drinks), toppings (e.g., sauces, condiments, dressings), or any other form of liquids that may be purchased by customers in a non-discretized manner. In some implementations, the non-discretized items may further include any type or form of solids such as beans (e.g., vegetable beans, coffee beans), candies (e.g., jelly beans, bulk snacks), powders (e.g., flours, salts, coffee grounds, tea leaves), meats or vegetables available at salad bars or like facilities, as well as slices of cake, pizza, meats or other food products, or any other form of solids that may be purchased by customers in a non-discretized manner. Moreover, the systems and methods of the present disclosure are not limited to detecting events involving the retrieval or distribution of non-discretized items. For example, those of ordinary skill in the pertinent arts will recognize that the systems and methods disclosed herein may also be used to detect and track events involving non-discretized products other than foods, such as fuels, soaps, or any other solvents, solutions, emulsions, suspensions or other liquids, as well as gravel, cements, fertilizers, soils, seeds or other solids. Such non-discretized items may be maintained in containers or vessels that are configured to maintain such items in any desired conditions, including but not limited to temperatures, pressures, humidities or other conditions. Additionally, in some implementations, the systems and methods of the present disclosure may detect events involving the retrieval or distribution of items other than non-discretized items, such as discretized items.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning tools, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which items, including but not limited to non-discretized items such as liquids, solids, or semi-liquid or semi-solid materials, are made available for retrieval by or distribution to actors, such as customers, including but not limited to events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers and/or associates) and recognize their respective interactions within a materials handling facility, including but not limited to events involving one or more items within the materials handling facility.

Figure 2:
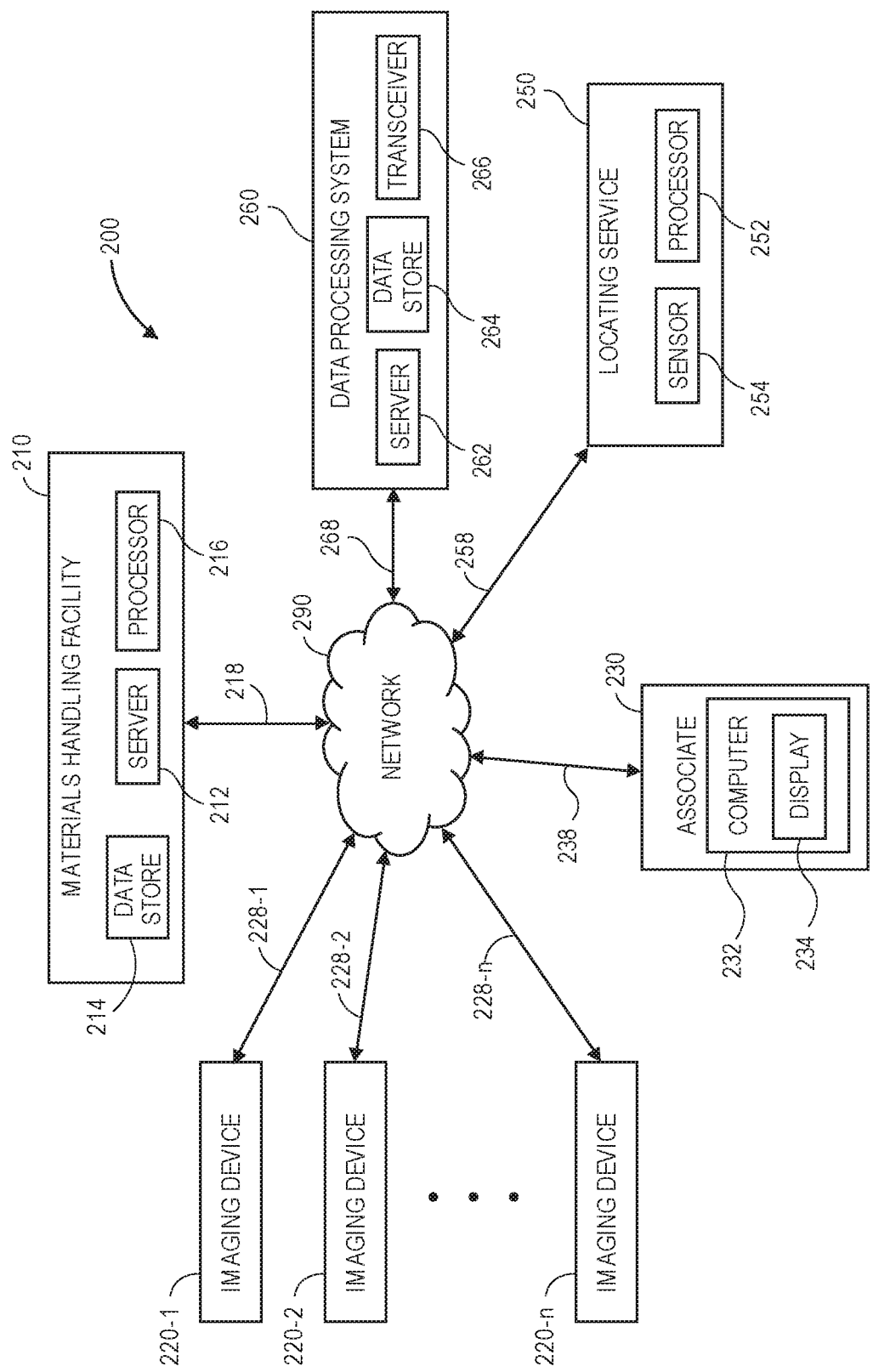
FIG. 2 is a block diagram of components of one system for detecting or confirming interactions in accordance with implementations of the present disclosure.

Referring to FIG. 2, a block diagram of components of one system 200 for detecting or confirming interactions in accordance with implementations of the present disclosure is shown. The system 200 includes a materials handling facility 210, a plurality of imaging devices 220-1, 220-2 . . . 220-n, a locating service 250 and a data processing system 260 that are connected to one another across a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1I.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts or volumes that may not be inherently organized into countable units, and may instead be managed in terms of measurable quantities such as units of length, area, volume, weight, time duration or other dimensional properties characterized by units of measurement.

Inventory items may be stored in one or more inventory locations within an inventory area, e.g., on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common inventory location within an inventory area. In other implementations, like inventory items may be stored in different inventory locations. For example, to optimize the retrieval of inventory items having high turnover rates or velocities within a large materials handling facility, such inventory items may be stored in several different inventory locations to reduce congestion that might be encountered if the items are stored at a single inventory location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one inventory location within an inventory area to another location. For example, in some instances, an inventory item may be picked from a first inventory location (e.g., a first inventory shelf or other storage unit) in an inventory area, moved a distance, and placed at a second inventory location (e.g., a second inventory shelf or other storage unit) in the inventory area.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning tools, systems or techniques. For example, in some implementations, the servers 212 may be configured to execute an artificial neural network, such as a convolutional neural network, to process imaging data received from one or more of the imaging devices 220-1, 220-2 . . . 220-n over the network 290.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2). The materials handling facility 210 may operate one or more order processing and/or communication systems using computer devices or resources in communication with one or more of the servers 212, the data stores 214 and/or the processors 216, or through one or more other computing devices or resources that may be connected to the network 290, as is indicated by line 218, in order to transmit or receive information in the form of digital or analog data, or for any other purpose.

The materials handling facility 210 may be associated with a plurality of imaging devices 220-1, 220-2 . . . 220-n (or other sensors), which may be any form of optical recording device that may be used to photograph or otherwise record imaging data of structures, facilities or items within the materials handling facility 210, or for any other purpose. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2 may include one or more sensors, memory or storage components, processors or transceivers, and such sensors, memory components, processors or transceivers may further include one or more photosensitive surfaces, filters, chips, electrodes, clocks, boards, timers or any other relevant features (not shown). For example, each of the imaging devices 220-1, 220-2 . . . 220-n may include one or more optical sensors, including color sensors (or grayscale sensors or black-and-white sensors) and/or depth sensors configured to capture visual imaging data (e.g., textures) or depth imaging data (e.g., ranges) to objects within one or more fields of view of the imaging devices 220-1,

220-2 ... 220-*n*. Additionally, the one or more processors, one or more memory components or one or more transceivers, and any other components (not shown), of the imaging devices 220-1, 220-2 ... 220-*n* may be configured to capture, analyze and/or store imaging data from within the materials handling facility 210 environment in which such imaging devices 220-1, 220-2 ... 220-*n* are provided. For example, the imaging devices 220-1, 220-2 ... 220-*n* may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceivers may be configured to enable the imaging devices 220-1, 220-2 ... 220-*n* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The imaging devices 220-1, 220-2 ... 220-*n* may be homogenous or heterogeneous in nature, in accordance with the present disclosure. For example, one or more of the imaging devices 220-1, 220-2 ... 220-*n* may have both color sensors and depth sensors. Alternatively, one or more of the imaging devices 220-1, 220-2 ... 220-*n* may have just a color sensor (or grayscale sensor or black-and-white sensor) or just a depth sensor. For example, in some implementations, one or more of the imaging devices 220-1, 220-2 ... 220-*n* may be configured to capture depth imaging data, e.g., distances or ranges to objects within their respective fields of view. In some implementations, one or more of the imaging devices 220-1, 220-2 ... 220-*n* may be configured to capture visual imaging data, e.g., visual images or images in color, grayscale or black-and-white. Moreover, in some implementations, the imaging devices 220-1, 220-2 ... 220-*n* may be calibrated, such that mappings between coordinates of imaging data captured by the imaging devices 220-1, 220-2 ... 220-*n* and directions relative to their respective image sensors are known.

One or more of the imaging devices 220-1, 220-2 ... 220-*n* may be an RGB color camera, a still camera, a motion capture/video camera or any other type or form of camera. In other implementations, one or more of the imaging devices 220-1, 220-2 ... 220-*n* may be depth-sensing cameras, such as an RGBz or RGBD camera. In still other implementations, one or more of the imaging devices 220-1, 220-2 ... 220-*n* may be a thermographic or infrared (IR) camera. Additionally, in some implementations, the imaging devices 220-1, 220-2 ... 220-*n* may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860× 480 at six frames per second that may likewise be configured to provide image data to other components (e.g., a graphics processing unit) for processing. In some implementations, the imaging devices 220-1, 220-2 ... 220-*n* may be paired to provide stereo imagery and depth information, and may include a pair of camera modules. Additionally, imaging data may be stored in any variety of formats, including but not limited to RGB, RAW, .BMP, .JPG or JPEG, .GIF, or the like.

The imaging devices 220-1, 220-2 ... 220-*n* may also include manual or automatic features for modifying their respective fields of view or orientations. For example, one or more of the imaging devices 220-1, 220-2 ... 220-*n* may be configured in a fixed position, or with a fixed focal length (e.g., fixed-focus lenses) or angular orientation. Alternatively, one or more of the imaging devices 220-1, 220-2 ... 220-*n* may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 ... 220-*n*, or changes in one or more of the angles defining the angular orientation.

For example, one or more of the imaging devices 220-1, 220-2 ... 220-*n* may be hard-mounted to a support or mounting that maintains the device in a fixed configuration or angle with respect to one, two or three axes. Alternatively, however, one or more of the imaging devices 220-1, 220-2 ... 220-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 220-1, 220-2 ... 220-*n* may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 ... 220-*n*, e.g., digital cameras, may be affected based on the lighting conditions and characteristics of the scenes in which the imaging devices 220-1, 220-2 ... 220-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2 includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form.

The materials handling facility 210 may also include any number of other sensors, components or other features for detecting one or more events or interactions therein, including one or more load sensors, RFID sensors, LIDAR sensors, or any other type or form of sensors. Information or data captured by a variety of sensors may be independently or collectively evaluated in order to determine a measure of a probability or likelihood that an event has occurred at a specific inventory location, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

The materials handling facility 210 may also include one or more other components or features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more associates 230, e.g., human operators or workers, who may be any designated personnel tasked with performing one or more tasks within the materials handling facility 210 in general, or within one or more inventory areas, receiving stations, distribution stations or other locations of the materials handling facility 210 in particular. The associates 230 may handle or transport items (e.g., any type or form of good, product, media or other tangible consumer article) within the materials handling facility 210, or operate one or more pieces of equipment therein (not shown).

The associates 230 may also operate one or more computer devices 232 or resources for registering the receipt, retrieval, transportation or storage of items within the materials handling facility 210, e.g., a general purpose device such as a personal digital assistant, a digital media player, a smartphone, a tablet computer, a desktop computer or a laptop computer, or a device that is specifically programmed, constructed or configured to execute one or more of the applications or functions described herein.

In some implementations, the computer devices 232 may include one or more wireless modules to facilitate communications with the servers 212, with one or more of the imaging devices 220-1, 220-2 . . . 220-n, or with one or more computer devices or resources, such as the servers 212, over the network 290, as indicated by line 238, as well as a display 234 (e.g., a touchscreen display) to facilitate the visible presentation of information or data to and interaction with the associates 230 or another human operator. The computer devices 232 may be configured to store a unique identifier associated with a given human operator, and provide the unique identifier to the servers 212 or to another computer device or resource in order to identify the human operator. In some implementations, the computer devices 232 may also include one or more other features, e.g., audio input/output peripherals or accessories, such as speakers or microphones, as well as video input/output peripherals or accessories, such as cameras, projectors, haptic peripherals, accessories such as keyboards, keypads, mouses, pointers, touchscreens, joysticks, control buttons, or other components. Such portable devices may operate in conjunction with or may otherwise utilize or communicate with one or more components of the materials handling facility 210.

Additionally, the computer devices 232 may be configured to execute any type or form of application for displaying information or data of any type or form to the associates 230, including but not limited to information identifying one or more customers or other personnel within the materials handling facility 210 (e.g., names, customer identification numbers or other identifiers, and images), as well as one or more embedded video files or links to such video files. The computer devices 232 may also be configured to execute any type or form of application for receiving interactions or other inputs from the associates 230, including but not limited to indications as to whether or which customer within the materials handling facility 210 executed an interaction with one or more items, as well as a number, a mass or a volume of the items associated with the interaction, or any other information regarding a transaction associated with such items.

The locating service 250 includes one or more processors 252 and one or more sensors 254 for detecting the presence or absence of one or more actors within the materials handling facility 210, and locating one or more poses, gestures or other actions executed by such actors within the materials handling facility 210. The processors 252 may be provided in the same physical location as the materials handling facility 210 or in one or more alternate or virtual locations, e.g., in a "cloud"-based environment.

The sensors 254 may be any components or systems for capturing information or data regarding the motion, locations and/or orientations of actors within operating ranges. In some implementations, the sensors 254 may include, but are not limited to, one or more imaging devices (e.g., digital cameras) having diverse fields of view of the materials handling facility 210, or other scenes, that are configured to capture data that may be processed to recognize and locate motion, locations and/or orientations of various actors within the materials handling facility 210. For example, in some implementations, an actor may present one or more credentials prior to entering the materials handling facility 210, or while such actors are present within the materials handling facility 210, within the fields of view of the sensors 254. One or more identifiers of the actor (e.g., an account number associated with the actor) may be determined based on such credentials, and assigned to pixels that are depicted or represented within such imaging data and correspond to the actor. Subsequently, the motion, locations and/or orientations of actors within the materials handling facility 210 may be monitored by the one or more sensors 254, which may include one or more of the imaging devices 220-1, 220-2 . . . 220-n, or other imaging devices or other sensors, based on such pixels. By assigning identifiers of actors to pixels, or by creating descriptors of pixels that are associated with actors, an actor may be identified in images that are subsequently captured by the sensors 254. When an actor has been identified as being associated with an event in which an item is retrieved or deposited, one of the item may be added to a virtual shopping cart or other record associated with the actor, or removed from the virtual shopping cart or other record associated with the actor, as necessary.

Alternatively, or in addition to imaging devices, the sensors 254 may include any other type of sensing systems for detecting actors and recognizing their motion, locations and/or orientations within the materials handling facility 210. Such sensors 254 may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors 254 that may gather information or data regarding actors and their motion, locations and/or orientations at the materials handling facility 210 are not limited.

The processors 252 may be programmed or otherwise configured to generate one or more trajectories or tracklets representative of the motion, the locations and/or the orientations of each of the actors within the materials handling facility 210, such as one or more three-dimensional articulated models of partial or complete sets of body parts of the actors within the materials handling facility 210, based on information or data gathered by the sensors 254. Such models may be generated as vectors or functions over time that represent motion of body parts embodied by nodes and edges between such nodes, or in any other manner.

For example, a number and positions of actors within a material handling facility may be identified based on imaging data captured by a plurality of cameras, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera. For example, a materials handling facility may include a scanner, a reader or other device configured to identify actors who enter or exit the materials handling facility, e.g., based on information or data provided by an application operating on a mobile device carried by such actors, or in any other manner. In some implementations, the cameras that are used to determine the number and/or the position of the actors within the materials handling facility may be one or more of the same sensors that detected the event. In some implementations, the cameras need not be the same sensors that detected the event.

In some implementations, nodes corresponding to body parts may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting or representing specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

The data processing system 260 includes one or more physical computer servers 262 having one or more data stores 264 (e.g., databases) and transceivers 266 associated therewith, as well as provided for any specific or general purpose. For example, the data processing system 260 of FIG. 2 may be independently provided for the exclusive purpose of receiving, analyzing or storing imaging data or other information or data received from the materials handling facility 210, the imaging devices 220-1 . . . 220-n, the computer devices 232 or the locating service 250, or, alternatively, provided in connection with one or more physical or virtual services that are configured to receive, analyze or store such imaging data or other information or data, as well as one or more other functions. In some implementations, the data processing system 260 may be associated with the materials handling facility 210, or any other physical or virtual facility.

The servers 262 may be connected to or otherwise communicate with the data stores 264, which may store any type of information or data, including but not limited to acoustic signals, information or data relating to imaging data, or information or data regarding environmental conditions, operational characteristics, or positions, for any purpose. For example, in some implementations, the servers 262 may process images captured by the imaging devices 220-1, 220-2 . . . 220-n, e.g., according to one or more machine learning tools or techniques. For example, one or more processors of each of the imaging devices 220-1, 220-2 . . . 220-*n* may be programmed or configured to execute one or more machine learning tools or techniques to detect one or more aspects of human actors or other objects, or to segment portions of imaging data that include the actors or objects. In some implementations, such processors may receive one or more of the images as inputs to such machine learning tools or techniques, and one or more aspects of the objects may be determined or predicted based on outputs received from the one or more machine learning tools or techniques. In some implementations, the imaging devices **220-1, 220-2 . . . 220-*n* may be configured to transmit the imaging data to one or more external computer devices or systems, which may be configured to execute one or more machine learning tools or techniques to detect one or more aspects of human actors or other objects, or to segment portions of imaging data that include the actors or objects, from the imaging data captured by one or more of the imaging devices 220-1, 220-2 . . . 220-*n***.

In some implementations, the servers 262 may be configured to execute an artificial neural network, such as a convolutional neural network, to process imaging data captured by one or more of the imaging devices **220-1, 220-2 . . . 220-*n***. For example, in some implementations, one such neural network may be a neural network backbone (e.g., a residual neural network backbone) with one or more output layers.

The servers 262, the computer data stores 264 and/or the transceivers 266 may also connect to or otherwise communicate with the network 290, as indicated by line 268, through the sending and receiving of digital data. For example, the data processing system 260 may include any facilities, stations or locations having the ability or capacity to receive and store information or data, such as media files, in one or more data stores, e.g., media files received from the imaging devices **220-1 . . . 220-*n*, or from one or more other external computer systems (not shown) via the network 290. In some implementations, the data processing system 260 may be provided in a physical location. In other such implementations, the data processing system 260 may be provided in one or more alternate or virtual locations, e.g., in a "cloud"-based environment. In still other implementations, the data processing system 260** may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touchscreen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "locating service," a "data processing system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "locating service," a "data processing system" or an "actor" (or "customer," or "user," or "worker," or "human operator") may be typically performed by a human, but could, alternatively, be performed by an automated agent.

The materials handling facility 210 (or any actors associated therewith), the imaging devices **220-1, 220-2 . . . 220-*n*, the associates 230, the locating service 250 and/or the data processing system 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the servers 212 may be adapted to transmit or receive information or data in the form of synchronous or asynchronous messages to or from the imaging devices 220-1, 220-2 . . . 220-*n*, the computer devices 232, the locating service 250 and/or the data processing system 260, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith), the imaging devices 220-1, 220-2 . . . 220-*n*, the associates 230, the locating service 250 and/or the data processing system 260 may operate any of a number of computing devices or resources that are capable of communicating over the network 290**, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the processor 216, the imaging devices **220-1, 220-2 . . . 220-*n*, the processor 252, the sensors 254** and/or the server 262, the data store 264 or the transceiver 266, or any other computers or control systems utilized by the materials handling facility 210, the imaging devices 220-1, 220-2 . . . 220-*n*, the associate 230, the locating service 250 and/or the data processing system 260 and having sequences of instructions which, when executed by a processor (e.g., a central processing unit, or "CPU," or a graphics processing unit, or "GPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors that are external to imaging devices, such as in one or more other physical, alternate or virtual locations, e.g., in a "cloud"-based environment. In some other implementations, each of such functions or tasks may be executed by processors associated with an imaging device, or two or more imaging devices, which may control one or more aspects of the capture, processing and/or storage of imaging data. In still other implementations, such functions or tasks may be executed in a distributed manner, such as by computer processors, systems or resources in two or more locations. For example, some of such functions or tasks may be executed by processors associated with one or more imaging devices, while other functions or tasks may be executed by processors located in one or more other physical, alternate or virtual locations.

As is discussed above, whether an interaction with one or more non-discretized items has occurred may be determined by establishing product spaces or bounding boxes associated with units for dispensing non-discretized items, e.g., as sets of points in three-dimensional space within a materials handling facility, and determining positions of one or more customers at designated or predetermined intervals. Where one or more body parts of a customer contacts or breaches a product space at a given time, or is located within a predetermined range of the product space at the given time, a notification may be provided to an associate via one or more computer devices.

Referring to FIG. 3, a flow chart 300 of one process for detecting or confirming interactions in accordance with implementations of the present disclosure is shown. At box 310, a dispensing unit is placed in a location within fields of view of one or more imaging devices at a materials handling facility, such as a retail store. The dispensing unit may be configured to store or distribute one or more items of any type or form. For example, the dispensing unit may be a carafe, a kettle, a fountain, or any other dispenser configured to store or release any number, mass or volume of non-discretized items. Alternatively, the dispensing unit may be configured to store or distribute one or more items other than non-discretized items.

The dispensing unit may be placed on a shelf, on a table, on a floor, or in any other inventory location of the materials handling facility, which may include one or more bays, slots, bins, racks, tiers, bars, hooks or cubbies, or any other features. In some implementations, the items may be liquids such as beverages (e.g., coffee), toppings, sauces, soups, dressings or the like. In some other implementations, however, the items may be solids such as powders (e.g., cocoa or flour), grains, beans, candy or the like. The imaging devices may be disposed in any locations and aligned at any orientations on a scene. In some implementations, the imaging devices may be calibrated, such that mappings between coordinates of imaging data captured by the imaging devices and directions relative to their respective image sensors are known. Moreover, an inventory location for the dispensing unit may be selected based on any basis, including but not limited to planogram data for at least a portion of the materials handling facility. The planogram data may consist of one or more diagrams, drawings or other representations of details regarding placements of products in one or more inventory locations at the materials handling facility, including but not limited to one or more surfaces within the storage area. In some implementations, the planogram data may comprise sets of coordinates or other identifiers of locations of surfaces at the materials handling facility, as well as whether or which of such surfaces is configured to store or distribute any number of items, at any level or degree of complexity.

At box 320, a product space associated with the location is established. The product space (or bounding box) may be defined by any number of points in three-dimensional space, e.g., by sets of Cartesian coordinates, or coordinates according to any other system. For example, the product space may include a plurality of pixels or positions of such pixels in three-dimensional space that surround, include or are otherwise associated with the dispensing unit, and may have any size or any shape with respect to the location of the dispensing unit.

At box 330, a record of actors within the materials handling facility is generated. For example, where a plurality of customers, associates, workers, vendors, personnel or other actors enter the materials handling facility, information or data regarding the actors may be captured using one or more sensors, such as imaging devices (e.g., digital cameras), scanners, readers or other systems.

At box 340, trajectories representative of locations, motion or orientations of actors at the materials handling facility are generated, e.g., as vectors or functions over time. For example, a locating service may generate one or more trajectories (or tracklets) representative of the motion, the locations and/or the orientations of each of the actors within the materials handling facility, such as one or more three-dimensional articulated models of partial or complete sets of body parts of the actors within the materials handling facility, based on information or data gathered by sensors (e.g., imaging devices, load sensors, RFID components, LIDAR components). In some implementations, the trajectories, tracklets and/or models may be generated as vectors or functions over time that represent motion of body parts embodied by nodes and edges between such nodes, or in any other manner. Such vectors or functions may be defined based on any type or form of data captured from within the materials handling facility using one or more sensors, including but not limited to imaging devices, LIDAR sensors, RFID sensors, or any other sensors. Alternatively, or in addition to trajectories, vectors or functions of any type or form may be used to represent the locations, motion or orientations of actors at the materials handling facility.

At box 350, positions of the actors are determined at designated intervals of time based on the trajectories generated at box 340. For example, where trajectories or other vectors or functions corresponding to the locations, motion or orientations of actors present at the materials handling facility are generated, e.g., by a locating service, positions in three-dimensional space determined from such vectors or functions may be determined at regular intervals of time, such as every ten seconds, or any other intervals of time. The positions may be represented in three-dimensional space by coordinates, e.g., (x, y, z), which identify positions of image sensors of the imaging devices, as well as angles of orientation of their respective image sensors, with respect to one or more axes. Furthermore, the positions may be determined continuously, e.g., over extended periods of time, or upon the occurrence of one or more events. For example, the positions of the actors may be determined upon identifying a failure or improper operation of one or more sensors associated with the product space, e.g., a failure of a load sensor or another component by which interactions with the product are typically detected, or upon determining that one or more customers is beyond an operating range of one or more sensors, such as imaging devices or other sensors dedicated to detecting or tracking customers within the materials handling facility.

At box 360, whether any actors have breached or entered within the product space established at box 320, is determined. For example, distances between positions of centroids, body parts or other aspects of the actors in three-dimensional space, as determined at box 350, are compared to positions on one or more surfaces of the product space established at box 320 in three-dimensional space. Where values corresponding to such distances are zero or negative for a given actor, or are below a predetermined threshold, the actor may be determined to have breached or contacted the product space, or to be within the predetermined range of the product space. If none of the actors has breached or entered within the predetermined range of the product space, then the process advances to box 370, where the record of the actors within the materials handling facility is updated, and to box 340, where the trajectories of the actors within the materials handling facility are updated. As is discussed above, whether actors have breached or entered within the product space may be determined continuously or following the occurrence of one or more events, such as a failure or improper operation of one or more sensors associated with a product space, e.g., a load sensor, or upon determining that one or more customers is beyond an operating range of a sensor that is typically dedicated or utilized to detecting or tracking customers within the materials handling facility.

If one or more of the actors has breached the product space or entered within the predetermined range of the product space, then the process advances to box 380, where a notification is transmitted to one or more associates, e.g., to computer devices such as smartphones, tablet computers, desktop computers or laptop computers operated by or accessible to such associates, or to one or more messaging accounts or clients maintained by or accessible to such associates. The notification may include an identifier of a specific actor that breached the product space or entered within the predetermined range of the product space, e.g., names, images, customer numbers or other relevant information, as well as video files, embedded video feeds, or links to video feeds captured prior to, at or after a time when the one or more actors breached the product space or entered within the predetermined range of the product space. Any relevant information regarding the breach of the product space by an actor, or the entry of the actor within the predetermined range of the product space, may be included within or may accompany the notification transmitted at box 380.

At box 390, whether the continued monitoring of the product space is desired is determined. For example, the product space may be within a materials handling facility that closes or otherwise ceases operations at a predetermined time. Alternatively, where the determination of positions began upon the occurrence of one or more events such as a failure of one or more sensors, whether the sensors have resumed normal operation or have been replaced may be determined. If the continued monitoring of the product space is desired, then the process returns to box 370, where the record of the actors within the materials handling facility is updated, and to box 340, where the trajectories of the actors within the materials handling facility are updated. If the continued monitoring of the product space is no longer desired, however, then the process ends.

As is discussed above, positions of actors on a scene may be determined from trajectories or other vectors or functions representative of locations, motion or orientations of such actors at designated or predetermined intervals and compared to positions of one or more aspects of a product space or bounding box that has been defined or established for a dispensing unit configured to store or distribute items, e.g., non-discretized items. Where body parts of one or more actors have breached or contacted a product space, or are within a predetermined range of the product space, an associate may be notified and prompted to determine whether a transaction involving the items has occurred, or to identify a customer associated with the transaction, based on video feeds captured from imaging devices that include the product space within their respective fields of view, or in any other manner.

Figure 4A:
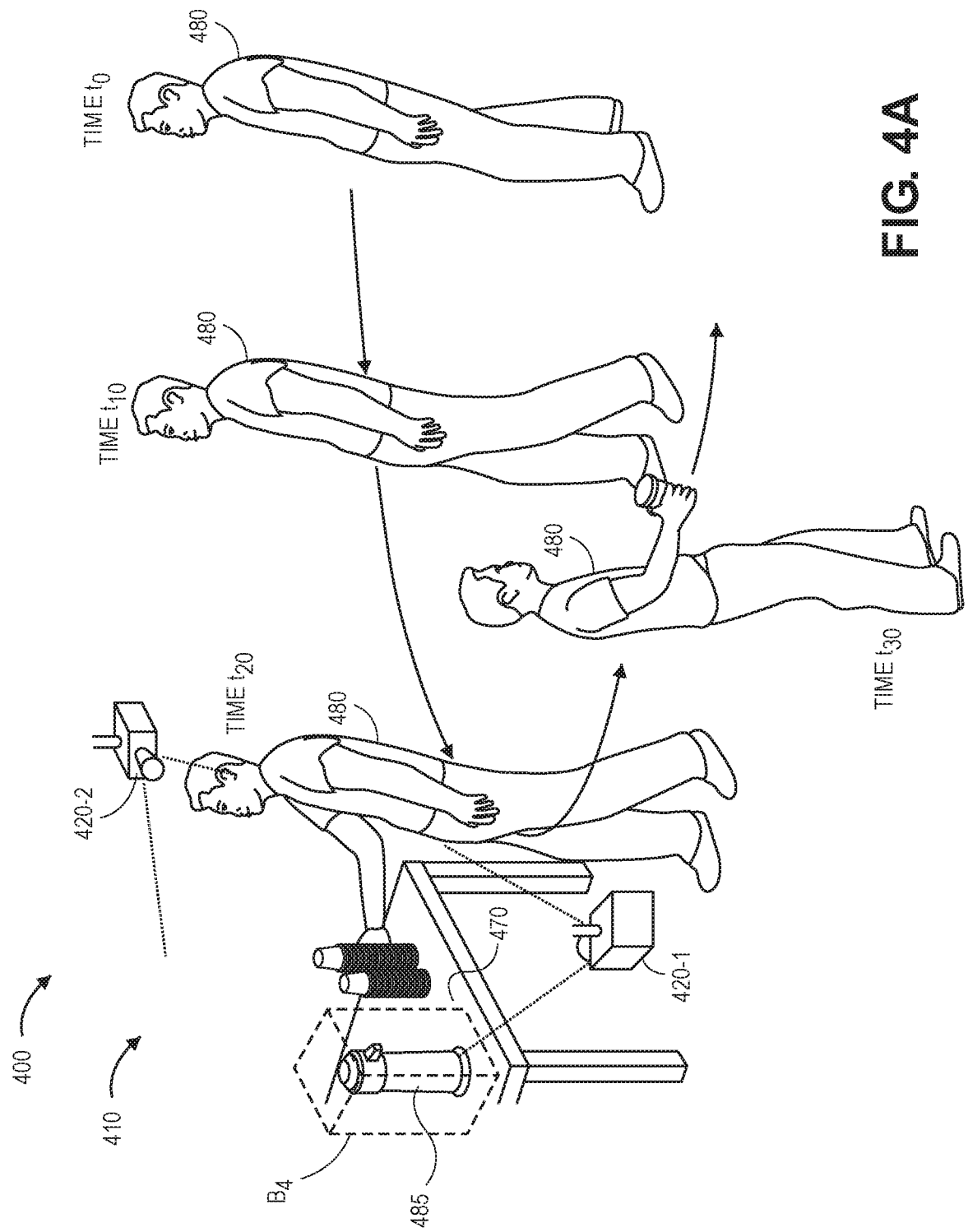
FIGS. 4A through 4C are views of aspects of one system for detecting or confirming interactions in accordance with implementations of the present disclosure.
Figure 4B:
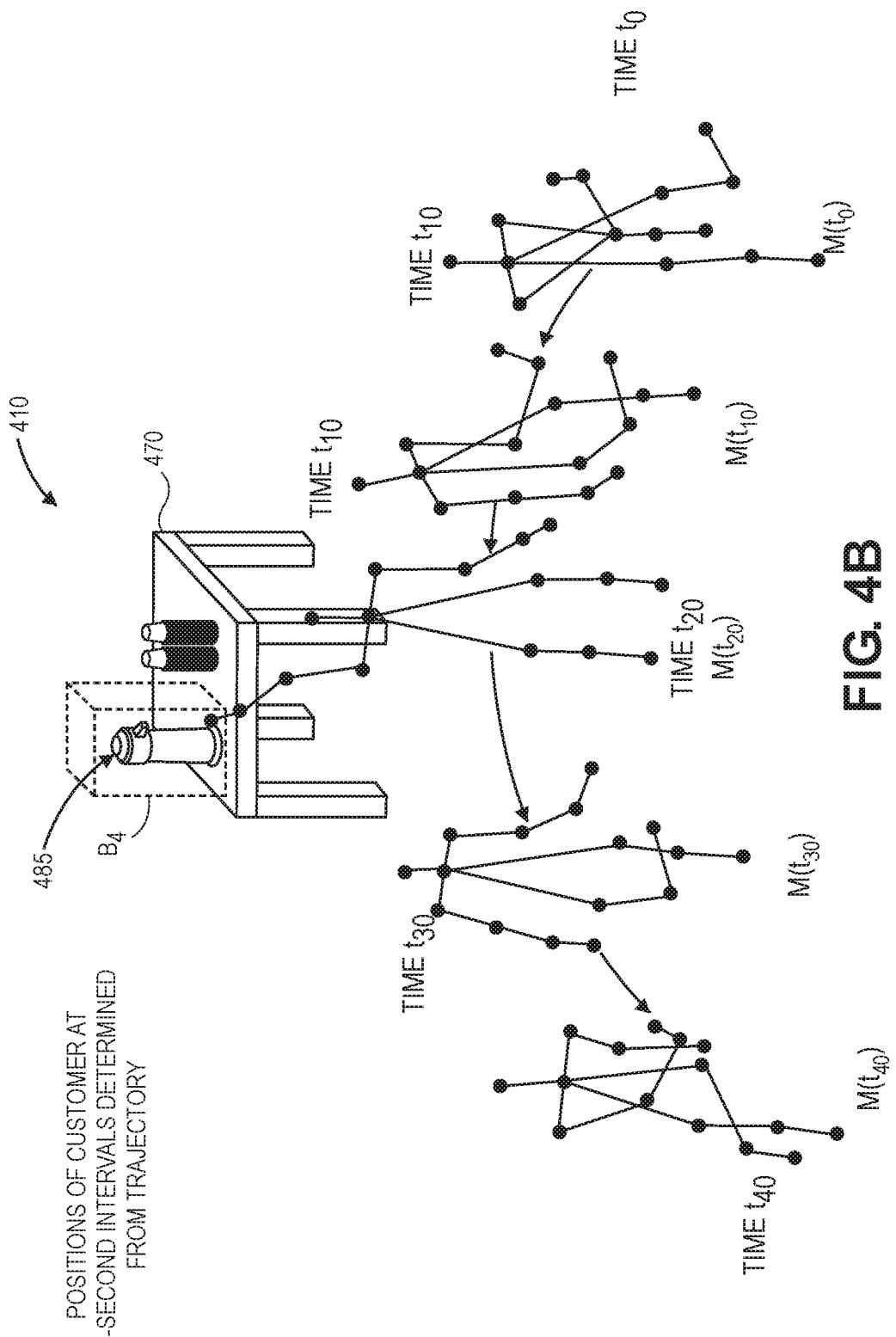
Figure 4C:
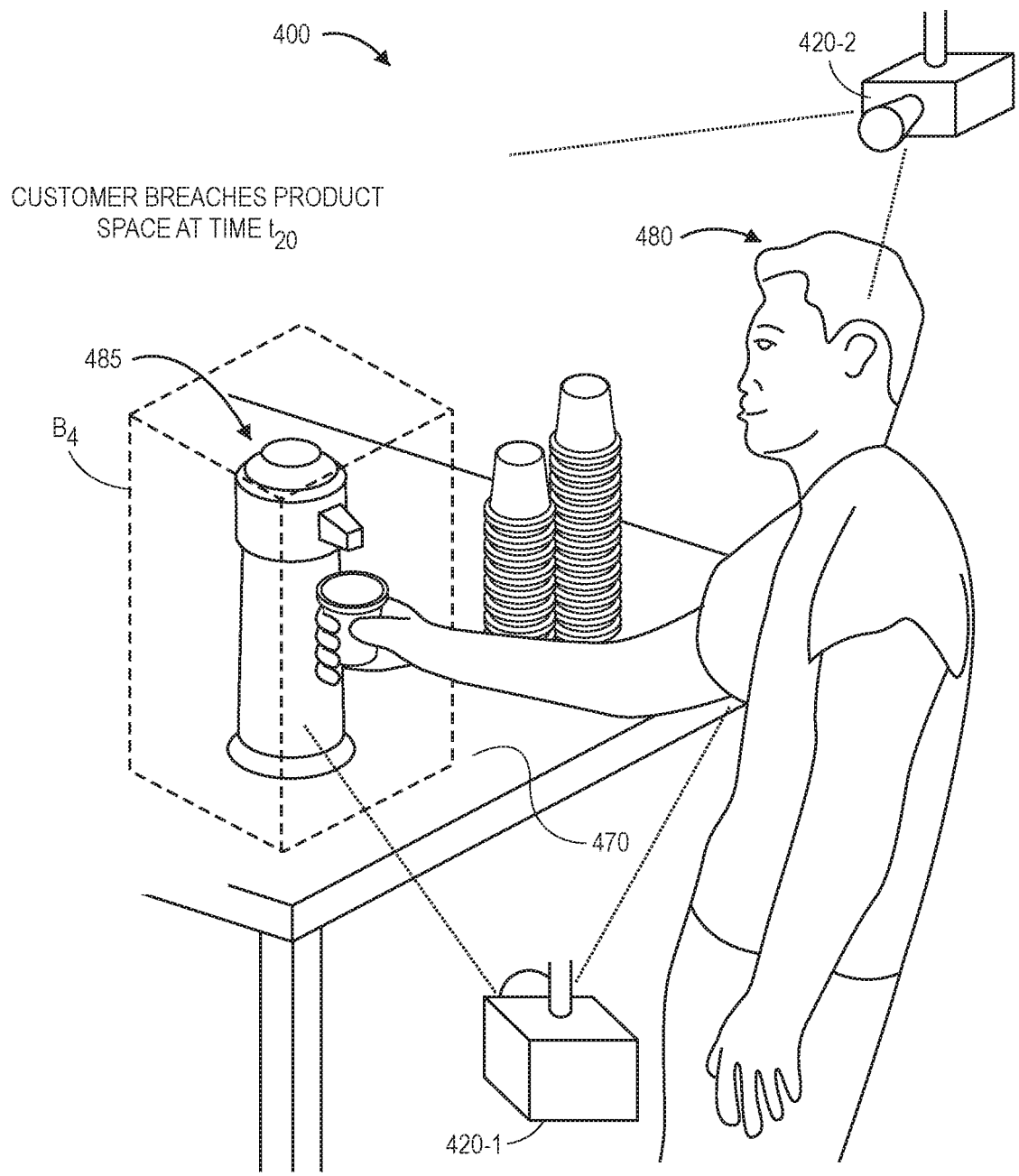

Referring to FIGS. 4A through 4C, views of aspects of one system for detecting or confirming interactions in accordance with implementations of the present disclosure are shown. Except where otherwise noted, reference numerals preceded by the number "4" shown in FIGS. 4A through 4C indicate components or features that are similar to components or features having reference numerals preceded by the number "2" shown in FIG. 2, or by the number "1" shown in FIGS. 1A through 1I.

As is shown in FIG. 4A, a system 400 includes a materials handling facility 410 or other scene having a storage unit 470 (e.g., a shelf, a table or another system) that is located within fields of view of one or more imaging devices 420-1, 420-2. The storage unit 470 includes a carafe (or another dispensing unit) 485 for maintaining non-discretized items (e.g., coffees or other beverages) in a desired condition or state (e.g., at a desired temperature or pressure). The storage unit 470 further includes a plurality of cups into which at least some of the non-discretized items within the carafe 485 may be dispensed. Alternatively, the storage unit 470 may include one or more systems or components for distributing items other than non-discretized items.

Each of the imaging devices 420-1, 420-2 is in communication with a network, e.g., by wired or wireless connections. Additionally, such cameras may be calibrated, such that mappings between coordinates of imaging data captured by the cameras and directions relative to their respective image sensors are known.

As is also shown in FIG. 4A, a bounding box $B_4$ defines an interaction point or product space with respect to the carafe 485. The bounding box $B_4$ may include a plurality of pixels or positions of such pixels in three-dimensional space that surround or are otherwise associated with the carafe 485. Alternatively, another bounding box (not shown in FIG. 4A) may define an interaction point or product space with respect to one or more of the cups. Additionally, as is also shown in FIG. 4A, a customer 480 located within the materials handling facility 410 passes by the storage unit 470 and the product space $B_4$ over a period of time including times $t_0, t_{10}, t_{20}, t_{30}, t_{40}$.

As is shown in FIG. 4B, positions of the customer 480 may be determined from a trajectory M(t) or another set of vectors or functions representative of locations, motion or orientations of the customer 480. The trajectory M(t) may be generated from information or data captured using one or more sensors, such as imaging devices (e.g., including one or more of the imaging devices 420-1, 420-2 or others not shown in FIGS. 4A through 4C), load sensors, RFID components, LIDAR components, or any other sensors. In some implementations, the trajectory M(t) may be obtained from a locating service that is dedicated at least in part to detecting actors, e.g., the customers 480, and determining positions of such actors throughout the materials handling facility 410.

As is shown in FIG. 4B, the positions of the actor 480 at designated intervals, e.g., every ten seconds, or at times $t_0, t_{10}, t_{20}, t_{30}, t_{40}$, are determined using the trajectory M(t). For example, values of the trajectory $M(t_0), M(t_{10}), M(t_{20}), M(t_{30}), M(t_{40}), M(t_0)$, corresponding to positions of the customer 480 at the times $t_0, t_{10}, t_{20}, t_{30}, t_{40}$ are determined.

As is shown in FIG. 4C, a breach of the product space $B_4$ by the customer 480 may be detected where a position of one or more body parts of the customer 480 (e.g., a right hand) is within one of the points in three-dimensional space that are included in the product space $B_4$. The positions of the body parts of the customer 480 may be determined in any manner, such as locations of one or more nodes corresponding to body parts of the customer 480, or edges between such nodes, that are defined by or represented in the trajectory M(t). Alternatively, the customer 480 may be determined to have entered within a predetermined range of the product space $B_4$ where one or more distances between positions of body parts of the customer 480, e.g., positions of one or more nodes or edges defined by or represented in the trajectory M(t), and positions of any of the points in three-dimensional space that are included in the product space $B_4$ are not greater than a predetermined threshold distance.

Upon determining that the customer 480 has breached the product space $B_4$, or has contacted or is within the predetermined range of the product space $B_4$, a notification may be transmitted to one or more computer devices operated by one or more associates at the materials handling facility 410. The notification may be a display of a user interface, or a message comprising a link or other set of instructions for causing a display of a user interface. For example, the notification may be transmitted to such computer devices by any messaging platform, protocol or technology, including but not limited to E-mail messages, SMS or MMS text messages, social media messages, or in any other manner. The notification, or a user interface accessed via the notification, may include video feeds captured using the imaging devices 420-1, 420-2 or others, or links to such video feeds. Additionally, the notification, or a user interface accessed via the notification, may further include identifiers of actors within the materials handling facility 410, e.g., the customer 480, and any number of interactive features by which an associate may record an indication that a transaction involving the non-discretized items within the carafe 485 has occurred, record an identifier of the customer 480 that performed the transaction, or record an amount of the non-discretized items associated with the transaction.

Figure 5:
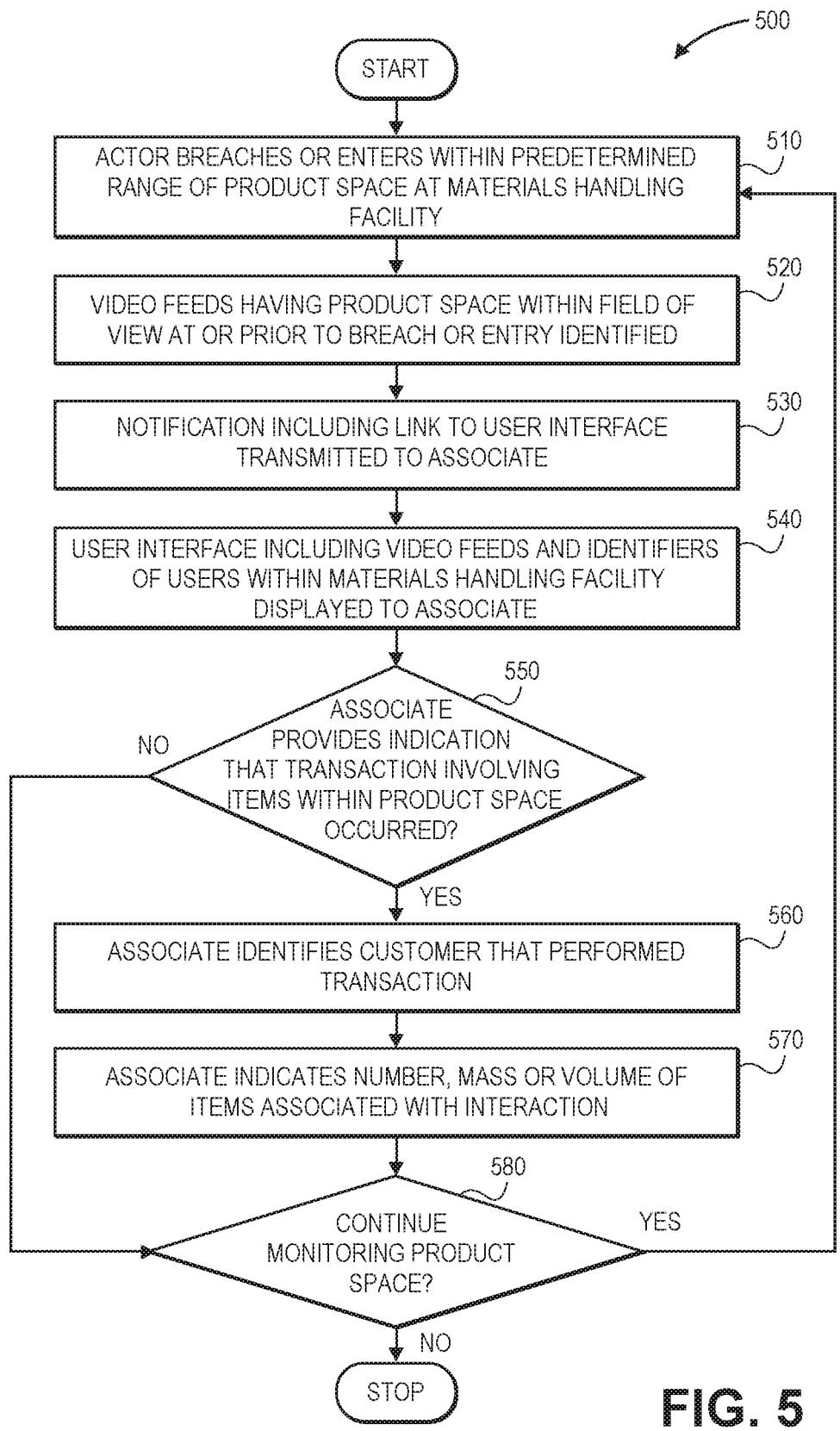
FIG. 5 is a flow chart of one process for detecting or confirming interactions in accordance with implementations of the present disclosure.

Referring to FIG. 5, a flow chart 500 of one process for detecting or confirming interactions in accordance with implementations of the present disclosure is shown. At box 510, an actor breaches or enters within a predetermined range of a product space at a materials handling facility at a time. For example, where a dispensing unit including non-discretized items is placed within a field of view of one or more imaging devices and a product space (or bounding box) is constructed in association with the dispensing unit, positions of boundaries or surfaces of the product space may be compared to positions of one or more actors within the materials handling facility at selected intervals, e.g., ten seconds, or any other intervals. An actor may have been determined to have breached or entered within the predetermined range of the product space where one or more body parts of the actor is located at a distance from the product space that is zero or negative, or less than a predetermined threshold.

At box 520, video feeds depicting the product space prior to, at or after the time at which the actor is determined to have breached or entered within the predetermined range of the product space are identified. For example, the video feeds may include any number of frames, or images captured for any duration, associated with the time at which the actor is determined to have breached or entered within the predetermined range of the product space. The video feeds may have been captured using each of the imaging devices that includes the product space within a field of view, or a select number of the imaging devices that are determined to have included the actor, the dispensing unit and/or the product space most clearly or with a fewest number of occlusions.

At box 530, a notification including a link to a user interface is transmitted to an associate. The notification may be transmitted in any manner, e.g., by one or more E-mail messages, SMS or MMS text messages, social media messages, or in any other manner. The link may be a link to one or more web-based or network resources including data or code for displaying the user interface in a browser or otherwise or, alternatively, a link that is configured to launch an application other than a browser that is operating on a computer device associated with the associate.

At box 540, the user interface including the video feeds and identifiers of actors within the materials handling facility is displayed to the associate, e.g., in response to a selection of the link within the notification transmitted at box 530. For example, a page or other representation may include identifiers of each of the actors within the materials handling facility, including but not limited to the actor that is determined to have breached or entered within the predetermined range of the product space at box 510. Such identifiers may include, but are not limited to, names, customer numbers, images or other identifiers of such actors. The page or other representation may further include any other relevant information or data regarding the actors, including but not limited to times at which the actors entered the materials handling facility, identifiers of items previously retrieved by such actors, or purchasing histories of such actors, or any other information or data regarding the actors.

The user interface may also include any number of interactive features for viewing the video feeds, e.g., buttons or other features for stopping, starting, slowing, speeding up, zooming, panning or otherwise manipulating the video feeds. The user interface may further include interactive features such as radio buttons, sliders, text boxes or fields, drop-down menus or like elements for entering one or more indications via the user interface. The user interface may also include any number of arrows, sliders or other features for viewing or operating the user interface or information displayed thereon in accordance with the present disclosure.

At box 550, whether the associate provides an indication that a transaction involving one or more non-discretized items within the product space has occurred is determined. For example, the associate may determine that the actor that was determined to have breached or entered within the predetermined range of the product space at box 510 did not retrieve any of the non-discretized items from within the product space. Alternatively, in some implementations, the associate may determine that the actor was not a customer, such as where the actor is a vendor, a third party, or another person that is not interested in obtaining any of the non-discretized items for personal consumption. In some other implementations, the associate may determine that the indication that the actor breached or entered within the predetermined range of the product space at box 510 was incorrect or inaccurate, e.g., a false positive, and video feeds upon which such a determination is based may be further utilized to train vision algorithms or other machine learning algorithms or techniques.

If the associate provides an indication that a transaction involving one or more non-discretized items has not occurred, then the process advances to box 580, where whether the monitoring of the product space is to continue is determined. If the continued monitoring of the product space is desired, then the process returns to box 510. If the continued monitoring of the product space is no longer desired, however, then the process ends.

If the associate provides an indication that a transaction involving one or more non-discretized items within the product space has occurred, then the process advances to box 560, where the associate identifies a customer that performed the transaction. The customer may be identified based on any information or data that is available to the associate, and by one or more interactions with a user interface. For example, an array of images of customers within the materials handling facility may be displayed to the associate, who may be prompted to select one of the images corresponding to a customer that performed the interaction, as depicted within the video feeds. Any other manner for receiving a designation of a customer may be provided in a user interface in accordance with the present disclosure.

At box 570, the associate indicates a number, a mass or a volume of non-discretized items associated with the interaction. For example, the associate may indicate the number, the mass or the volume by entering a corresponding number into a text box or selecting the corresponding number from a drop-down menu or other feature. At box 580, whether the monitoring of the product space is to continue is determined. If the continued monitoring of the product space is desired, then the process returns to box 510. If the continued monitoring of the product space is no longer desired, however, then the process ends.

As is discussed above, upon determining that one or more actors has breached, contacted or otherwise entered within a predetermined range of a product space or bounding box associated with a dispensing unit for a non-discretized item at a given time, a user interface having one or more sections for displaying video feeds captured prior to, at or after the given time may be presented to an associate, e.g., on a computer display. The associate may then determine whether a transaction involving the non-discretized items has occurred, and enter an indication of an identity of a customer involved in the transaction, or a number, a mass or a volume or other amount of the non-discretized item associated with the transaction.

Referring to FIGS. 6A through 6D, views of aspects of one system for detecting or confirming interactions in accordance with implementations of the present disclosure are shown. Except where otherwise noted, reference numerals preceded by the number "6" shown in FIGS. 6A through 6D indicate components or features that are similar to components or features having reference numerals preceded by the number "4" shown in FIGS. 4A through 4C, by the number "2" shown in FIG. 2, or by the number "1" shown in FIGS. 1A through 1I.

Figure 6A:
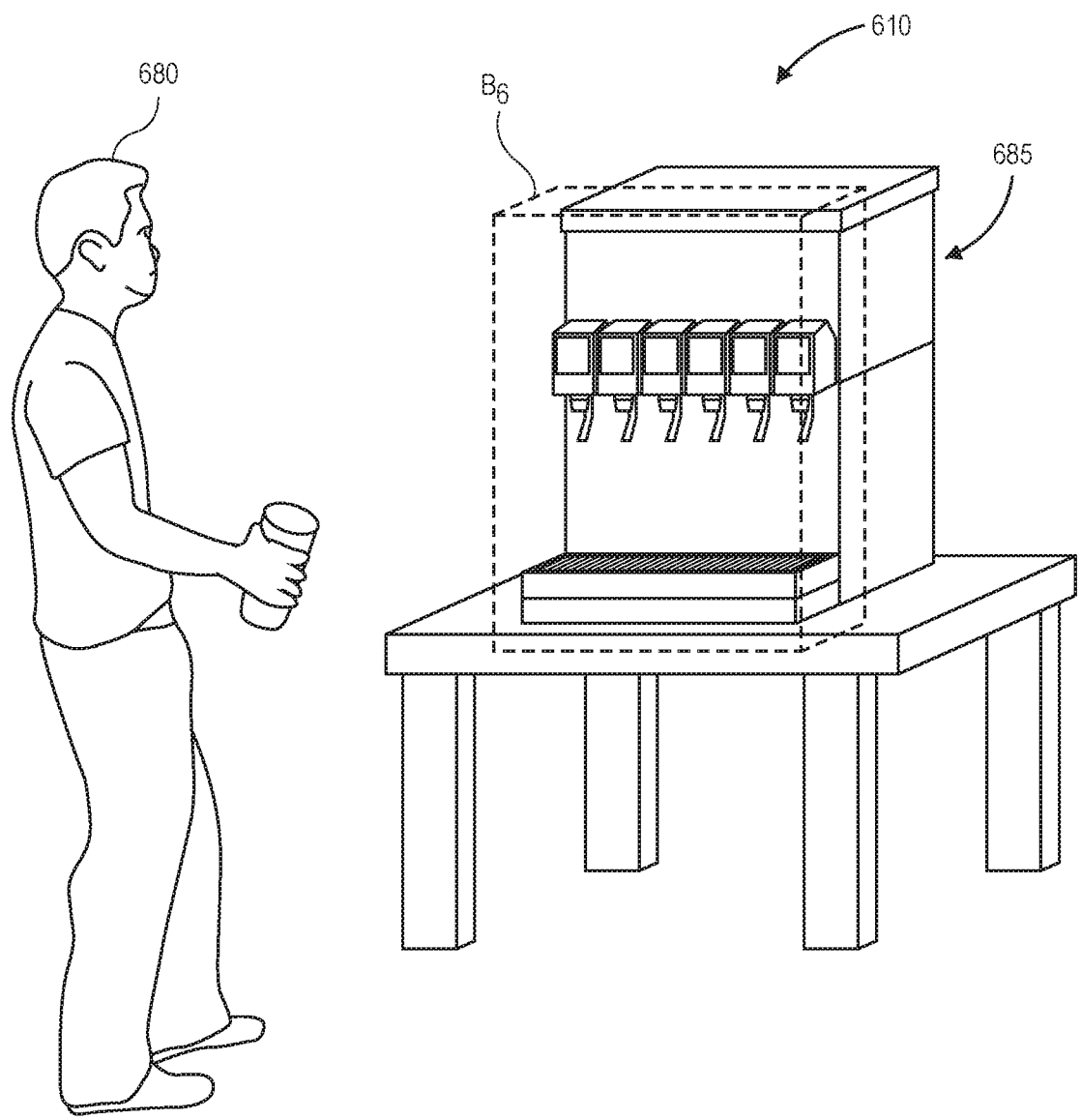
FIGS. 6A through 6D are views of aspects of one system for detecting or confirming interactions in accordance with implementations of the present disclosure.

As is shown in FIG. 6A, a product space (or bounding box) $B_6$ is established for a dispensing unit 685 (e.g., an automated beverage fountain) at a materials handling facility 610, such as a retail store. The dispensing unit 685 is configured to distribute a non-discretized item, e.g., a fountain drink or another beverage, into one or more containers or vessels, such as cups. The product space $B_6$ may include any number of points in three-dimensional space, e.g., by sets of Cartesian coordinates, or coordinates according to any other system, that define a location where an interaction by a customer (e.g., the customer 680) may result in an interaction with the dispensing unit 685. As is also shown in FIG. 6A, the customer 680 approaches the dispensing unit 685 with a cup to receive the non-discretized item.

Figure 6C:
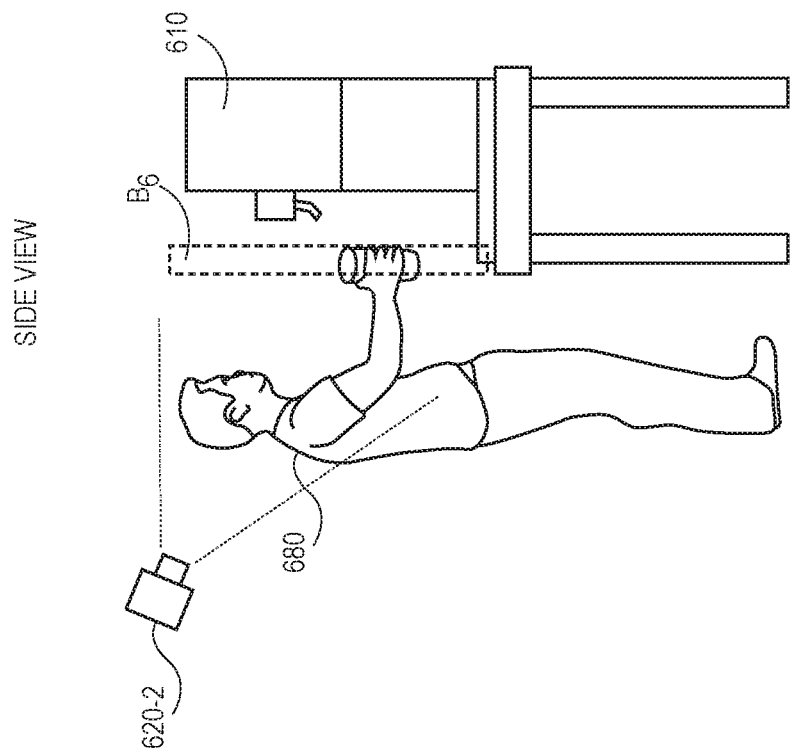
Figure 6B:
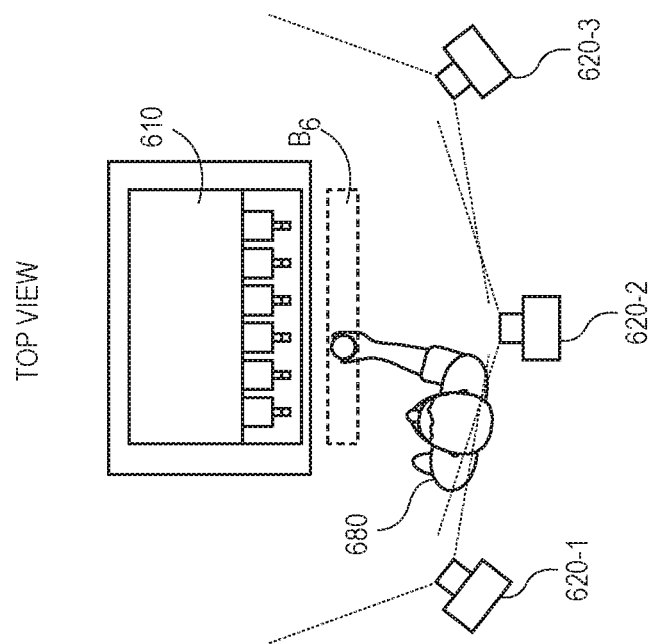

As is shown in the top view of the materials handling facility 610 of FIG. 6B and the side view of the materials handling facility 610 of FIG. 6C, the customer 680 breaches the product space $B_6$ associated with the dispensing unit, or contacts or enters within a predetermined range of the product space $B_6$, where a position of one or more body parts of the customer 680, or of an object associated with the customer 680, e.g., a cup or another container, contacts or is located at one or more of the points in three-dimensional space by which the product space $B_6$ has been defined or established.

Figure 6D:
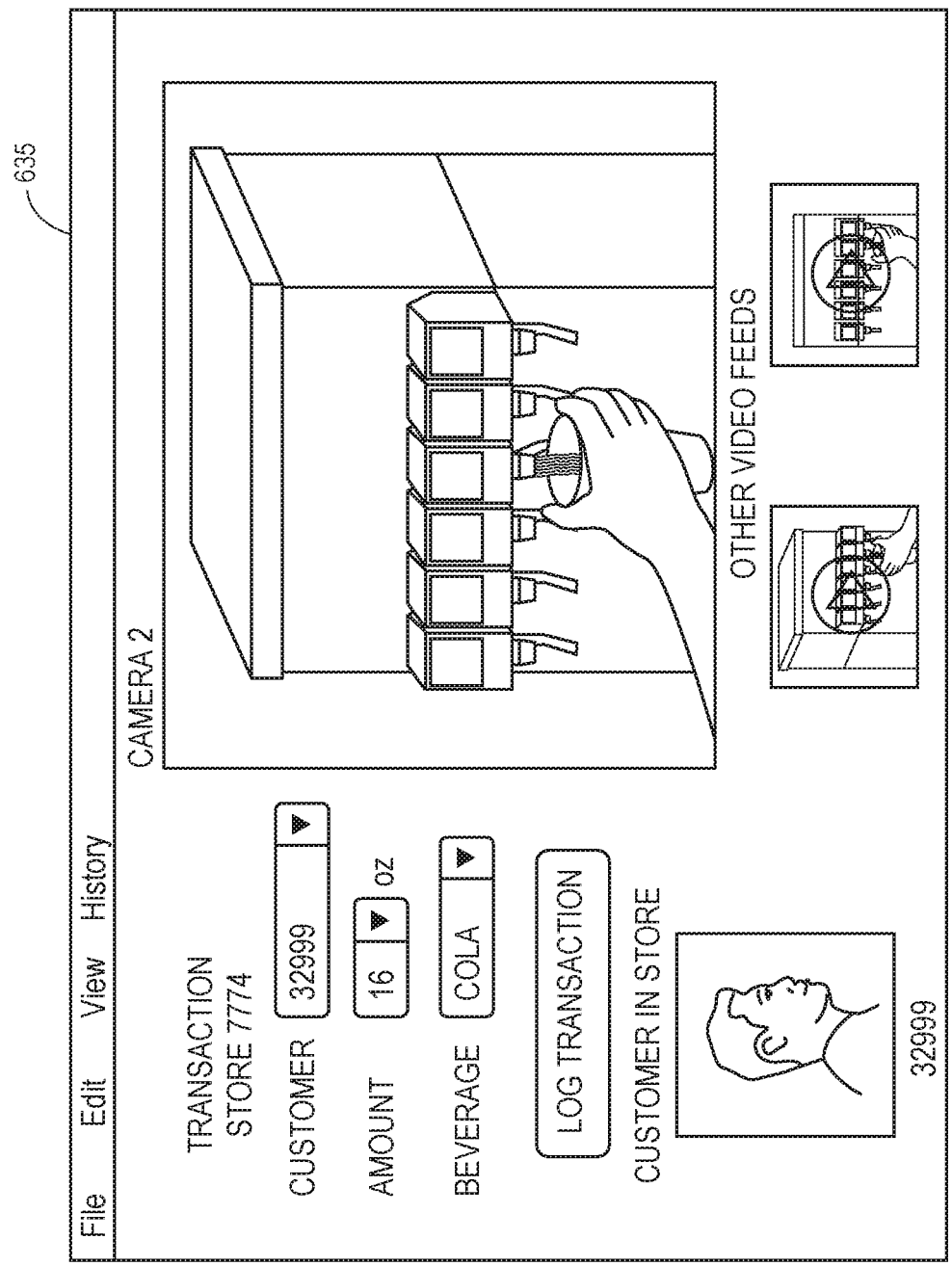

Upon determining that the customer 680 has breached, contacted or otherwise passed within a predetermined range of the product space $B_6$, a notification is transmitted to an associate, and video feeds including the product space $B_6$ within a field of view are presented to the associate in a user interface. As is shown in FIG. 6D, a user interface 635 includes a video section in which a video feed captured at or around the time at which the customer 680 breached the product space $B_6$ may be displayed, and an other views section beneath the video section in which links to video feeds are displayed. Additionally, the user interface 635 includes a customer identifier section including a customer number (or other identifier, e.g., a name) and an image of the customer 680. The user interface 635 further includes a transaction recordation section where an associate, upon viewing one or more of the video feeds, may make one or more interactions with the user interface 635 to indicate whether a transaction involving the non-discretized items in the dispensing unit 685 occurred during at or around the time of the breach of the product space $B_6$, and, if a transaction did occur, whether the customer 680 is responsible for the transaction.

The user interface 635 may be generated or rendered by any type or form of application operating on a computer device accessible to an associate, including but not limited to a browser, such as where the user interface 635 is a web page, or a dedicated application configured for the purposes of one or more general or specific functions.

Using the user interface 635, an associate (or other worker) may view one or more video feeds to determine whether the customer 680 has executed an interaction with the dispensing unit 685 that resulted in the receipt of non-discretized items therefrom. For example, because the dispensing unit 685 is a beverage fountain that is configured to dispense non-discretized items by contact with one or more levers, an associate may evaluate the one or more video feeds via the user interface 635 in order to determine whether the customer 680 executed any forward extensions or reverse flexions of arms and/or hands into and out from the bounding box or region $B_6$ that resulted in the distribution of at least some of the non-discretized items therefrom. Furthermore, if a number of customers are present at the materials handling facility 610, in addition to the customer 680, an associate may determine which of the customers executed the interaction.

Moreover, an associate may also make a determination as to how much of the non-discretized items were dispensed to the customer 680 and, where the dispensing unit 685 is configured to dispense one or more types of non-discretized items, which of the items is so dispensed. For example, a duration of an event or interaction may be determined based at least in part on the imaging data, which may depict not only contact with one or more of contact levers or other features of the dispensing unit 685 over a period of time but also an initiation of such contact, or an end to such contact. An amount (e.g., a number, a mass or a volume) of the non-discretized items dispensed may be determined based on the imaging data.

The user interface 635 further includes a number of interactive features such as radio buttons, sliders, text boxes or fields, drop-down menus or like elements for entering one or more indications via the user interface 635. Indications made by an associate via the user interface 685 may be used to update a virtual "shopping cart" or other record associated with a given customer, to execute a financial exchange (e.g., to deduct payment from a customer), to update an inventory record regarding a number of available items in a given location, or to take any other action.

Although some of the implementations disclosed herein reference the detection of events or interactions with non-discretized items such as beverages, soups or other liquids, or the association of human actors with events or interactions, or items associated with such events or interactions, the systems and methods of the present disclosure are not so limited. For example, the systems and methods disclosed herein may be used to associate any non-human animals, as well as any number of machines or robots, with events, interactions or items of one or more types. Furthermore, although some of the implementations disclosed herein reference associating actors with interactions with specific items or items of a specific type in a commercial setting, e.g., within a materials handling facility such as a retail store or fulfillment center, the systems and methods of the present disclosure are likewise not so limited. Rather, the systems and methods disclosed herein may be utilized to associate actors with events occurring within any type of commercial or non-commercial settings.

Furthermore, although some of the implementations disclosed herein describe events involving the retrieval (e.g., picking) of non-discretized items of one or more types from a storage unit or other location at a materials handling facility, the systems and methods disclosed herein are not so limited, and may be utilized to associate events involving the depositing (e.g., stowing) of items of one or more types at a storage unit or other location in accordance with the present disclosure. Trajectories or tracklets of such actors may be generated and used to determine which of such actors may have deposited an item of a given type at the location, in a manner that is similar but reciprocal to one or more of the processes discussed above.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A materials handling facility comprising:
 a first digital camera having a first field of view;
 a second digital camera having a second field of view;
 a storage unit comprising a shelf, wherein at least a portion of the shelf is within each of the first field of view and the second field of view;
 a first container of non-discretized items disposed on the portion of the shelf, and
 a server in communication with the first digital camera and the second digital camera, wherein the server comprises at least one processor configured to at least:
  establish a product space associated with the first container, wherein the product space is defined by a set of points in three-dimensional space including the first container;
  receive a first plurality of images from the first digital camera, wherein each of the first plurality of images was captured during a first period of time;
  receive a second plurality of images from the second digital camera, wherein each of the second plurality of images was captured during the first period of time;
  determine a first trajectory of a first customer within the materials handling facility during at least a first portion of the first period of time;
  determine a second trajectory of a second customer within the materials handling facility during at least a second portion of the first period of time;
  determine, based at least in part on the first trajectory and the second trajectory, locations of the first customer and the second customer at each of a plurality of times during the first period of time, wherein each of the plurality of times is separated by a predetermined interval;
  determine, at a first time in accordance with the predetermined interval, that at least one of the first customer or the second customer is within a predetermined range of the product space, wherein the first time is within the first period of time; and
  in response to determining that at least one of the first customer or the second customer is within the predetermined range of the product space,
   retrieve at least a first subset of the first plurality of images, wherein the first subset of the first plurality of images is captured over a second period of time including the first time;
   retrieve at least a second subset of the second plurality of images, wherein the second subset of the second plurality of images is captured over the second period of time; and
   cause a display of a user interface on a computer display, wherein the user interface is configured to display a video feed comprising at least one of the first subset of the first plurality of images or the second subset of the first plurality of images.

2. The materials handling facility of claim 1, wherein the user interface comprises a first interactive feature for indicating that at least one of the first subset of the first plurality of images depicts an interaction with the first container, and wherein the at least one processor is further configured to at least:
 receive, via the first interactive feature, an indication that a transaction involving the non-discretized items occurred during the second period of time.

3. The materials handling facility of claim 2, wherein the user interface further comprises a second interactive feature for identifying an actor that executed the interaction with the first container of the non-discretized items, and wherein the at least one processor is further configured to at least:
  receive, via the second interactive feature, an indication associating the transaction with one of the first customer or the second customer.

4. The materials handling facility of claim 1, further comprising at least one sensor in communication with the server,
  wherein the portion of the shelf is within an operating range of the at least one sensor, and
  wherein the at least one processor is further configured to at least:
    capture data by at least one sensor; and
    determine trajectories of each of a plurality of actors based at least in part on the data captured by the at least one sensor, wherein the plurality of trajectories comprises the first trajectory and the second trajectory.

5. A method comprising:
  establishing a product space associated with a dispensing unit configured to dispense at least one item, wherein the product space comprises a plurality of points in three-dimensional space associated with the dispensing unit, and wherein the product space is located in a materials handling facility;
  capturing a first plurality of images by at least a first imaging device over a first period of time, wherein the dispensing unit is within a first field of view of the first imaging device;
  capturing data by at least one sensor within the materials handling facility over at least the first period of time;
  storing at least the first plurality of images in at least one data store;
  determining, based at least in part on the data, that a plurality of customers are located within the materials handling facility during the first period of time;
  determining that at least one of the plurality of customers is not within an operating range of the at least one sensor at a first time;
  in response to determining that at least one of the plurality of customers is not within the operating range of the at least one sensor at the first time,
    determining whether at least one customer is within a predetermined range of the product space at times according to a predetermined interval;
  in response to determining that at least a first customer is within the predetermined range of the product space at a second time, wherein the first customer is one of the plurality of customers, wherein the second time is one of the times, and wherein the second time follows the first time,
    retrieving at least a first subset of the first plurality of images, wherein the first subset of the first plurality of images was captured over at least a second period of time including the second time; and
    causing a display of at least one user interface by a computer device, wherein the at least one user interface comprises:
      a first section configured to display at least the first subset of the first plurality of images; and
      a second section comprising at least one interactive feature for receiving at least one of:
        a first indication that an interaction with a non-discretized item occurred;
        a second indication that the interaction with the non-discretized item did not occur; or
        a third indication identifying a customer that executed the interaction.

6. The method of claim 5, wherein the method further comprises:
  receiving, from the computer device over a network, at least one of the first indication or the second indication.

7. The method of claim 6, further comprising:
  receiving, from the computer device over the network, at least the third indication, wherein the third indication identifies the first customer.

8. The method of claim 5, further comprising:
  determining that at least some of the plurality of customers are depicted within a portion of at least one of the first plurality of images;
  storing, for the at least some of the plurality of customers, an identifier of one of the plurality of customers in association with a portion of one of the first plurality of images depicting the one of the at least some of the plurality of customers,
  wherein the at least one user interface further comprises:
    a third section comprising identifiers of the at least some of the plurality of customers and portions of the first plurality of images depicting the at least some of the plurality of customers.

9. The method of claim 5, wherein determining whether at least one customer is within the predetermined range of the product space at times according to the predetermined interval comprises:
  determining a position of at least a portion of the first customer at the second time based at least in part on the data captured by the at least one sensor at the second time; and
  determining that a distance between the position of at least the portion of the first customer and a position of at least a portion of the product space is less than the predetermined range at the second time.

10. The method of claim 5, wherein the at least one sensor comprises at least one of:
  the first imaging device;
  a second imaging device;
  a LIDAR sensor; or
  an RFID sensor.

11. The method of claim 5, wherein determining whether at least one customer is within the predetermined range of the product space at times according to the predetermined interval comprises:
  detecting at least a portion of the first customer within at least a first image, wherein the first image is one of the first plurality of images;
  determining a distance between the portion of the first customer and at least one of the plurality of points in three-dimensional space based at least in part on at least the first image; and
  determining that the distance is less than the predetermined range.

12. The method of claim 5, further comprising:
  capturing a second plurality of images by at least a second imaging device during the first period of time;
  identifying at least the first customer in at least the second plurality of images; and
  generating a first trajectory of the first customer based at least in part on at least some of the second plurality of images, wherein the first trajectory represents positions of at least a portion of the first customer during the first period of time, wherein determining that at least the first customer is within the predetermined range of the product space at the second time is based at least in part on the first trajectory.

13. The method of claim 12, wherein the first trajectory comprises a plurality of nodes and a plurality of edges,
   wherein each of the nodes corresponds to a body part of the first customer,
   wherein each of the edges connects two of the nodes, and wherein the method further comprises:
      determining that a position of one of the nodes in three-dimensional space corresponds to a position of at least a portion of the product space at the second time.

14. The method of claim 5, wherein the predetermined interval is approximately ten seconds.

15. A method comprising:
   establishing a product space associated with a dispensing unit configured to dispense at least one item, wherein the product space comprises a plurality of points in three-dimensional space associated with the dispensing unit;
   capturing a first plurality of images by at least a first imaging device over a first period of time, wherein the dispensing unit is within a first field of view of the first imaging device;
   capturing a second plurality of images by at least a second imaging device over the first period of time, wherein the dispensing unit is within a second field of view of the second imaging device, and wherein the second field of view overlaps the first field of view at least in part;
   storing at least the first plurality of images in at least one data store;
   determining whether at least one customer is within a predetermined range of the product space at times according to a predetermined interval;
   in response to determining that at least a first customer is within the predetermined range of the product space at a first time, wherein the first time is one of the times,
      retrieving at least a first subset of the first plurality of images, wherein the first subset of the first plurality of images was captured over at least a second period of time including the first time;
      retrieving at least a second subset of the second plurality of images, wherein the second subset of the second plurality of images was captured over at least the second period of time; and
      causing a display of at least one user interface by a computer device, wherein the at least one user interface comprises:
         a first section configured to display at least the first subset of the first plurality of images;
         a second section comprising at least one interactive feature for receiving at least one of:
            a first indication that an interaction with a non-discretized item occurred;
            a second indication that the interaction with the non-discretized item did not occur; or
            a third indication identifying a customer that executed the interaction; and
         a third section having a first linked element corresponding to the first subset of the first plurality of images and a second linked element corresponding to the second subset of the second plurality of images,
   wherein the first section is configured to display one of a first video feed comprising the first subset of the first plurality of images or a second video feed comprising the second subset of the second plurality of images in response to a selection of one of the first linked element or the second linked element.

16. The method of claim 15, further comprising:
   determining that a sensor associated with the dispensing unit is not functioning properly at a second time, wherein the second time is prior to the first time, and
   wherein whether at least one customer is within the predetermined range of the product space at the times according to the predetermined interval is determined in response to determining that the sensor associated with the dispensing unit is not functioning properly at the second time.

17. The method of claim 15, wherein the predetermined interval is approximately ten seconds.

18. A method comprising:
   capturing a first plurality of images by a first imaging device having a first field of view, wherein each of the first plurality of images was captured during a first period of time, wherein an inventory location for an item is within the first field of view;
   capturing a second plurality of images by a second imaging device having a second field of view, wherein each of the second plurality of images was captured during the first period of time, wherein the second field of view overlaps the first field of view at least in part, and wherein the inventory location is within the second field of view;
   detecting at least a portion of a first customer in at least a portion of the first plurality of images or at least a portion of the second plurality of images;
   generating a first trajectory of the first customer based at least in part on the at least a portion of the first plurality of images or the at least a portion of the second plurality of images, wherein the first trajectory represents locations of at least the portion of the first customer during the first period of time;
   determining, based at least in part on the first trajectory, locations of the first customer at each of a plurality of times within the first period of time, wherein each of the plurality of times is separated by a predetermined interval;
   determining, based at least in part on the locations of the first customer, that the customer is within a predetermined range of a product space established with respect to the inventory location at a first time, wherein the first time is one of the plurality of times;
   in response to determining that the first customer is within the predetermined range of the product space at the first time,
      retrieving at least a first subset of the first plurality of images, wherein each of the first subset of the first plurality of images is captured over a second period of time including the first time, and wherein the second period of time is within the first period of time;
      retrieving at least a second subset of the first plurality of images, wherein each of the second subset of the second plurality of images is captured over the second period of time; and
      causing a display of a user interface on a computer display, wherein the user interface is configured to display at least one of:

a first video feed comprising at least the first subset of the first plurality of images; or a second video feed comprising at least the second subset of the second plurality of images.

19. The method of claim 18, further comprising:

receiving, via the user interface,
   a first indication that an interaction with the container occurred; and
   a second indication identifying a customer that executed the interaction.

20. The method of claim 18, further comprising:

receiving, via the user interface, an indication that an interaction with the container did not occur.

21. A method comprising:

capturing a first plurality of images by a first imaging device having a first field of view, wherein each of the first plurality of images was captured during a first period of time, wherein an inventory location for an item is within the first field of view;

detecting at least a portion of a first customer in at least a portion of the first plurality of images;

generating a trajectory of the first customer based at least in part on the portion of the first plurality of images, wherein the trajectory represents locations of at least the portion of the first customer during the first period of time;

determining, based at least in part on the trajectory, locations of the first customer at each of a plurality of times within the first period of time, wherein each of the plurality of times is separated by a predetermined interval;

determining, based at least in part on the locations of the first customer, that the customer is within a predetermined range of a product space established with respect to the inventory location at a first time, wherein the first time is one of the plurality of times; and in response to determining that the first customer is within the predetermined range of the product space at the first time,
   retrieving at least a first subset of the first plurality of images, wherein each of the first subset of the first plurality of images is captured over a second period of time including the first time, and wherein the second period of time is within the first period of time; and
   causing a display of a user interface on a computer display, wherein the user interface is configured to display at least a first video feed comprising at least the first subset of the first plurality of images.

22. A facility comprising:

at least one camera;

a storage unit, wherein at least a portion of the storage unit is within a field of view of the at least one camera;

a container of non-discretized items disposed on the portion of the storage unit; and a server in communication with the least one camera, wherein the server is programmed with one or more sets of instructions that, when executed, cause the server to at least:
   establish a product space associated with the container, wherein the product space is defined by a set of points in three-dimensional space including the container;
   receive a plurality of images from the least one camera, wherein each of the plurality of images was captured during a first period of time;
   determine a first trajectory of a first customer within the facility during at least a first portion of the first period of time;
   determine a second trajectory of a second customer within the facility during at least a second portion of the first period of time;
   determine, based at least in part on the first trajectory and the second trajectory, locations of the first customer and the second customer at each of a plurality of times during the first period of time, wherein each of the plurality of times is separated by a predetermined interval;
   determine, at a time in accordance with the predetermined interval, that at least one of the first customer or the second customer is within a predetermined range of the product space, wherein the time is one of the plurality of times; and
   in response to determining that at least one of the first customer or the second customer is within the predetermined range of the product space,
      retrieve at least a subset of the plurality of images, wherein the subset of the plurality of images is captured over a second period of time including the time; and
      cause a display of a user interface on a computer display, wherein the user interface is configured to display a feed comprising at least one of the subset of the first plurality of images.

* * * * *